(12) United States Patent
Arnstein et al.

(10) Patent No.: US 11,476,714 B2
(45) Date of Patent: Oct. 18, 2022

(54) WIRELESS POWER TRANSFER ALONG A PRESCRIBED PATH

(71) Applicant: Searete, LLC, Bellevue, WA (US)

(72) Inventors: Lawrence F. Arnstein, Seattle, WA (US); Daniel Arnitz, Seattle, WA (US); Jeffrey A. Bowers, Bellevue, WA (US); Joseph A. Hagerty, Seattle, WA (US); Guy S. Lipworth, Seattle, WA (US); David R. Nash, Arlington, WA (US); Matthew S. Reynolds, Seattle, WA (US); Clarence T. Tegreene, Mercer Island, WA (US)

(73) Assignee: Searete LLC, Bellevue, WA (US)

( * ) Notice: Subject to any disclaimer, the term of this patent is extended or adjusted under 35 U.S.C. 154(b) by 539 days.

(21) Appl. No.: 16/404,416

(22) Filed: May 6, 2019

(65) Prior Publication Data

US 2019/0341812 A1   Nov. 7, 2019

Related U.S. Application Data

(60) Provisional application No. 62/667,921, filed on May 7, 2018.

(51) Int. Cl.
*H02J 50/20* (2016.01)
*H02J 50/90* (2016.01)
(Continued)

(52) U.S. Cl.
CPC .............. *H02J 50/20* (2016.02); *B60L 53/14* (2019.02); *B60L 53/36* (2019.02); *B64C 39/024* (2013.01);
(Continued)

(58) Field of Classification Search
CPC .... H02J 50/20; H02J 7/025; H02J 7/20; H02J 7/90; H01Q 15/14; H01Q 15/148;
(Continued)

(56) References Cited

U.S. PATENT DOCUMENTS

| | | | | |
|---|---|---|---|---|
| 3,569,976 A | * | 3/1971 | Korvin ................. | H01Q 3/2658 343/777 |
| 7,158,081 B2 | * | 1/2007 | Pietig .................. | H01Q 21/065 343/700 MS |

(Continued)

*Primary Examiner* — Richard Isla
*Assistant Examiner* — Dung V Bui
(74) *Attorney, Agent, or Firm* — Phillips Winchester; Justin K. Flanagan

(57) ABSTRACT

Systems and methods are described herein for providing wireless power to a mobile device, such as an aerial mobile device like an unmanned aerial vehicle (UAV). A navigational constraint model may prescribe a navigation path along which a wireless power transmission system can provide wireless power to the mobile device. Deviations from the prescribed path may require the mobile device to self-power. The prescription of a navigation path allows for the use of reduced-complexity wireless power transmitters that are fully capable of servicing the prescribed path. Multiple embodiments of prescribed paths with various limitations and features are set forth herein, along with multiple embodiments of wireless power transmission systems of reduced complexity and functionality to fully service the various embodiments of prescribed paths.

27 Claims, 25 Drawing Sheets

(51) Int. Cl.
*H01Q 15/14* (2006.01)
*B60L 53/36* (2019.01)
*B60L 53/14* (2019.01)
*H02J 7/02* (2016.01)
*B64C 39/02* (2006.01)
*B64D 47/00* (2006.01)

(52) U.S. Cl.
CPC ........... *B64D 47/00* (2013.01); *H01Q 15/148* (2013.01); *H02J 7/025* (2013.01); *H02J 50/90* (2016.02); *B64C 2201/042* (2013.01); *B64C 2201/066* (2013.01)

(58) Field of Classification Search
CPC ........ B60L 53/36; B60L 53/14; B64C 39/024; B64C 2201/042; B64C 2201/066; B64D 47/00
USPC .......................................................... 320/107
See application file for complete search history.

(56) References Cited

U.S. PATENT DOCUMENTS

| | | | | |
|---|---|---|---|---|
| 7,656,345 | B2* | 2/2010 | Paschen | H01Q 19/08 |
| | | | | 342/75 |
| 8,604,989 | B1* | 12/2013 | Olsen | H01Q 25/008 |
| | | | | 343/754 |
| 9,246,235 | B2* | 1/2016 | Smith | H01Q 3/242 |
| 10,135,123 | B1* | 11/2018 | Arnitz | H01Q 15/0086 |
| 10,211,674 | B1* | 2/2019 | Leabman | H02J 50/27 |
| 10,367,259 | B2* | 7/2019 | Shor | H01Q 1/42 |
| 10,812,123 | B1* | 10/2020 | Bennett | H04B 3/52 |
| 2004/0196834 | A1* | 10/2004 | Ofek | H01Q 21/065 |
| | | | | 370/352 |
| 2011/0038308 | A1* | 2/2011 | Song | H04B 7/0695 |
| | | | | 370/328 |
| 2014/0118191 | A1* | 5/2014 | Smith | H01Q 19/30 |
| | | | | 342/372 |
| 2014/0354064 | A1* | 12/2014 | Tseliakhovich | H01Q 1/02 |
| | | | | 307/104 |
| 2015/0091756 | A1* | 4/2015 | Casciato | H01Q 3/20 |
| | | | | 342/377 |
| 2015/0180120 | A1* | 6/2015 | Pietraski | H01Q 19/191 |
| | | | | 342/368 |
| 2017/0141368 | A1* | 5/2017 | Ricci | B60L 53/53 |
| 2017/0188377 | A1* | 6/2017 | Reis | H04W 52/0209 |
| 2017/0243485 | A1* | 8/2017 | Rubin | H04W 4/026 |
| 2017/0366242 | A1* | 12/2017 | Lee | H04B 7/0408 |

* cited by examiner

WIRELESS POWER TRANSFER ALONG A PRESCRIBED PATH

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application claims priority to U.S. Provisional Patent Application No. 62/667,921 filed on May 7, 2018, titled "Wireless Power Transfer Along a Prescribed Path," which application is hereby incorporated by reference in its entirety along with any and all publications, patents, and patent applications identified therein.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to antenna systems and methods for wireless power transfer. Specifically, this disclosure relates to wireless power transfer to a mobile receiver of a mobile device, such as an unmanned aerial vehicle (UAV).

BRIEF DESCRIPTION OF THE DRAWINGS

Many of the drawings described below and included as part of this disclosure are simplified functional diagrams that are not intended to be limiting in any way. For instance, the quantities, shapes, dimensions, relative dimensions, and other attributes of the various depictions are merely provided to facilitate an understanding of the detailed description by persons of skill in the art.

DETAILED DESCRIPTION

Figure 1A:
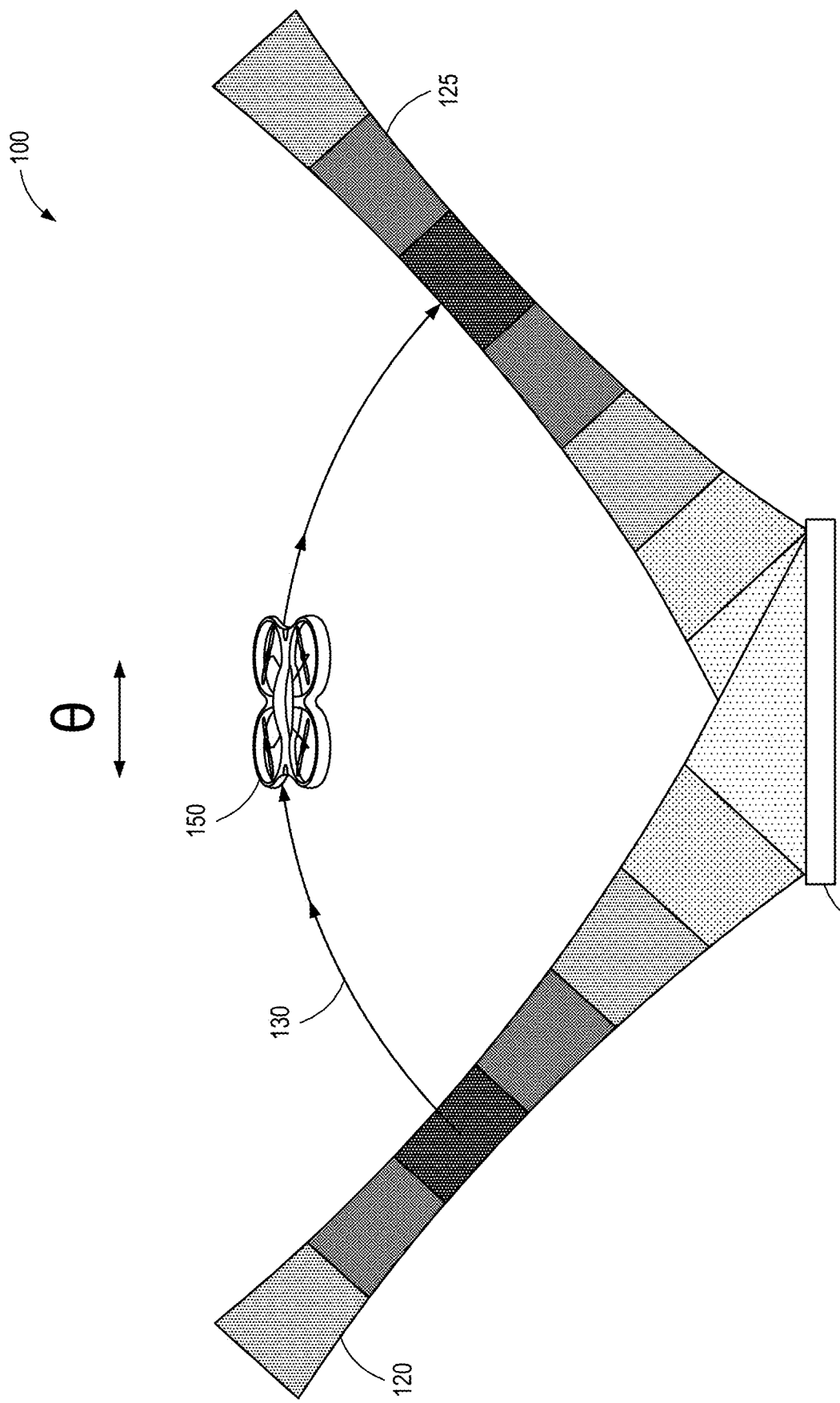
FIG. 1A illustrates an example of wireless power transmission system with a relatively wide steering angle in the θ-direction for use in a navigational constraint model that limits travel along a fixed, one-dimensional path at a fixed distance corresponding to a fixed focal range of the wireless power transmission system.

According to various embodiments of the systems and methods described herein, a wireless power transmission system provides wireless power to a receiver of a mobile device as it navigates along a spatially constrained path. Characteristics of the wireless power transmission system can be adapted to accommodate various navigational constraint models. The complexity, power consumption, cost, and/or computing demands of the wireless power transmission system generally increase as the navigational constraints are loosened. Relatedly, the reliability and/or durability of the wireless power transmission may decrease as the navigational constraints are loosened.

In an unrestrained navigational model, a mobile device may not spatially constrained. For example, the mobile device, such as an unmanned aerial vehicle (UAV) or drone, may travel in any direction and at any height within a three-dimensional region served by a wireless power transmission system. A network of such wireless power transmission systems may be deployed to serve a plurality of adjacent three-dimensional regions that could conceivably allow for uninhibited travel by the UAV along any path, in any direction, and at any height within a large region. Practical considerations may limit the elevation to a minimum height and maximum height.

The wireless power transmission systems in such a deployment would need to be capable of extreme wide-angle scanning and have a large focal range for beamforming power to a UAV, regardless of its current location, altitude, and direction of travel. Such a wireless power transmission system might, for example, be embodied as a large, complex, and expensive phased array with many elements and phase shifters, and require significant computing power.

Thus, an unrestrained navigational model may not be easily or fully serviceable by wireless power transmission systems due to cost, complexity, and technological barriers. In contrast, navigational constraint models that restrict and/or prescribe one or more navigation paths within a region allow for a simplified wireless power transmission system, as discussed in greater detail below.

As used herein, the term "focal range" corresponds to the distance between the wireless power transmission system and the focus of a beam generated by the wireless power transmission system. Thus, a wireless power transmission system with a "fixed focal range" is a wireless power transmission system that maintains a constant distance between the wireless power transmission system and the focus of a transmitted beam, regardless of the steering angle. In another example, each steering angle corresponds to a specific, static focal range, but various steering angles may correspond to different focal ranges. In contrast, a wireless power transmission system with a variable focal range allows for changes in the distance between the wireless power transmission system and the focus of the transmitted beam, independent of the steering angle.

One example of a navigational constraint model limits a mobile device to travel in a single direction along a specific, one-dimensional path within a three-dimensional region at a fixed focal range. As used herein, a "fixed focal range" is generally used to describe a focal range that is approximately constant. The flight path of the mobile device in such an embodiment would resemble an arc of a circle with the wireless power transmission system at the center of the circle. A network of wireless power transmission systems in this navigation constraint model would allow a mobile device to travel in one direction along a fixed path of arcs connected end to end.

A wireless power transmission system in such a deployment would only need to provide one-dimensional beam steering and could have a very small focal range, or even provide a fixed focal range, since the mobile device remains at a fixed distance relative to the wireless power transmission system. Such a wireless transmission system might, for example, be embodied as a one-dimensional antenna array, such as a phased-array, a reflective array, a transmissive array, and/or a one-dimensional metamaterial surface antenna.

Various other antenna architectures capable of one-dimensional beam steering may be utilized, including architectures relying on mechanical deformation and/or rotation. For example, mechanical deformation or rotation of a reflector lens of a wireless power transmission system may allow for one-dimensional beam steering at a fixed focal range. As another example, a wireless power transmission system may include an electrically adjustable gradient index (GRIN) lens that allows for one-dimensional beam steering along a prescribed path. A tunable lens and/or tunable reflector might also be utilized to allow for one-dimensional beam steering with limited or no focal range adjustment.

As another example, a wireless power transmission system may include a driver to drive a leaky waveguide (e.g., a non-uniform leaky wave antenna) at various operating frequencies. Each operating frequency of the drive signal may correspond to a different steering angle of the wireless power beam along a dimension of the leaky waveguide. In one embodiment, a distribution pattern of irises on a leaky waveguide may respond to variations in the frequency of the drive signal by modifying the steering angle, focal range, and/or beam width of the transmitted wireless power beam.

An operational frequency range and slot spacing (or another feature spacing) may be selected to provide a sufficiently large steering angle for the mobile device to navigate along the fixed path. The fixed path may include navigation from a first three-dimensional region served by a first wireless power transmission system to a second three-dimensional region served by a second wireless power transmission system. The spacing of wireless power transmission systems in a network of wireless power transmission systems may also be a function of obstacle avoidance, desired beamforming overlap during mobile device handoff from one wireless power transmission system to another, and/or ensuring that mobile devices can maintain minimum altitude while navigating the network.

Many UAVs utilize rotors to provide vertical lift. For example, a quadcopter (or hexacopter, octocopter, etc.) may include four (or more) horizontally aligned rotors that provide lift. Using a quadcopter as the example, to move in a given direction, the quadcopter tilts downward in the direction of travel, converting some of the lift into forward thrust. In navigational constraint models that only allow for travel in one direction, the transmit aperture of the wireless power transmission systems may be tilted to attain better planar alignment with the tilted receive aperture of the traveling quadcopter. In such embodiments, many or even all wireless power transmission systems in a network of wireless power transmission systems may be angled in the prescribed direction of travel.

Another navigational constraint model may allow a mobile device to travel along a fixed, one-dimensional path within a three-dimensional region at a constant elevation. The navigational constraint model may allow for bidirectional travel or unidirectional travel. Accordingly, the distance between the mobile device and the wireless power transmission system is variable along the flight path. A wireless power transmission system in such a navigational constraint model may accommodate one-dimensional beam steering and an adjustable focal range.

If the navigational constraint model prescribes a specific elevation, the focal range is a fixed value for a given beam steering angle. For example, a wireless power transmission system may be augmented with a static reflective or transmissive structure that correspondingly varies the focal length of the transmitted power beam as a function of the beam steering angle. For instance, a static reflective structure may include a series of reflectors with varying focal lengths for each beam steering angle of the wireless power transmission system. A series of lenses could be arranged relative to a transmitter at the various beam steering angles to accomplish a similar result.

Another navigational constraint model may allow a mobile device to travel along a fixed, quasi-one-dimensional path within a three-dimensional region. The navigational constraint model may allow for constant-elevation travel, fixed-distance travel, bidirectional travel, and/or unidirectional travel. The navigational constraint model may be characterized as "quasi-one-dimensional" because the mobile device can freely travel in one dimension (along the prescribed path), but has limited mobility in the other dimension(s).

A wireless power transmission system in such a model may have a relatively wide steering angle in one dimension (the θ-direction along the length of the transmitter) and a relatively small steering angle in another dimension (φ-direction perpendicular to the length of the transmitter. The focal range or focal length of the wireless power transmission system may vary based on the steering angle (e.g., for constant-elevation travel). Alternatively, the focal range of the wireless power transmission system may be substantially static, in which case the mobile device may travel in an arc to maintain a constant distance from the transmitter.

In such a model, a wireless power transmission system may have subwavelength (e.g., half-wavelength) inter-element spacing in the direction corresponding to the primary steering (i.e., the θ-direction) and greater than half-wavelength inter-element spacing in the direction corresponding to the secondary steering (i.e., the φ-direction). For instance, a wireless power transmission system might have tens, hundreds, or even thousands of phase-adjustable elements with close inter-element spacing that allows for a wide-angle steering at relatively high gain in the θ-direction, but fewer than ten phase-adjustable elements with wider inter-element spacing to provide for limited, but sufficient, beam steering for a given navigational constraint model. The number of elements in each direction, and the corresponding physical dimensions for a given element spacing in each direction, may be selected to achieve a target achievable beam shape including beam spot diameter and acceptable levels of sidelobes and grating lobes.

Wireless power transmission systems may incorporate a traditional two-dimensional phased array to provide wireless power to a mobile device within any of the navigational constraint models described above. However, traditional two-dimensional phased arrays have several drawbacks, including their cost and complexity. One advantage of limiting mobile device travel under a navigational constraint model is that less complex transmission systems can be utilized. In many situations, the travel restrictions imposed by a navigational control model do not place any practical limitations on the mobile device. In such situations, the navigational constraint model allows for the use of simplified transmission systems that are more reliable, cost less, require less compute power, and/or consume less energy.

For example, one or more UAVs may travel between various locations above or between one or more warehouses, businesses, residences, cities, states, etc. to perform a specific task (e.g., deliver products, perform surveillance, monitor traffic, collect air samples, monitor weather, etc.). In an unrestrained navigational model, a network of fully steerable phased arrays could be deployed to provide wireless power to the UAV regardless of its location, altitude, or direction of travel. Again, the terms "unrestrained" and "unconstrained" are used to describe navigational models in which the UAV is free to travel in three dimensions within legal and practical limits. For example, an "unconstrained" or "unrestrained" navigational model may still require that UAV's maintain a minimum altitude and/or maximum altitude, but allow the UAV unrestrained or unconstrained navigation therebetween. Even still, such a deployment with three-dimensionally unrestrained navigation may not financially practical and may not be technologically practical either.

In many instances, the UAVs may be able to perform their tasks and travel to their various destinations along a set of prescribed paths that could be envisioned as highways in the sky. While following a prescribed path, the UAV would receive wireless power from a wireless power transmission system. The received wireless power may be used to power the UAV and/or charge an energy storage device, such as a capacitor or a battery. If the UAV needs to leave the prescribed paths to perform its task, it may lose the ability to receive wireless power. While outside of the prescribed path, the UAV may utilize an alternative power source, such as a battery. When the UAV re-enters the prescribed path, the UAV may begin receiving wireless power again and could recharge its batteries. In some embodiments, the prescribed paths may be a network or grid of crisscrossing paths in the sky at 90-degree or other angles relative to one another.

A combination of one or more of the navigational constraint models described herein may be implemented at various locations within a relatively large region, such as a city, state, encampment, or even an entire country. A network of wireless power transmission systems may serve the navigation paths prescribed by the one or more navigational constraint models. As described herein, many of the navigational constraint models allow for greatly simplified wireless power transmission systems.

Wireless power transmission systems may be greatly simplified relative to a fully steerable phased array. The reduced functionality of a simplified wireless power transmission system may not impact its suitability for a given navigational constraint model. Depending on the navigational constraint model employed, one or more of a wide variety of simplification techniques may be employed to reduce the cost, complexity, and resource demand of wireless power transmission systems. Some examples of simplified wireless power transmission systems for particular navigational constraint models are described herein. Additional examples are described below, and still more examples are described in conjunction with the drawings.

For example, a wireless transmission system may include a two-dimensional array of rows and columns. The rows may extend along the steering direction (e.g., the θ-direction) and the columns may extend in the limited- or non-steering direction (i.e., the φ-direction). In one embodiment, each column of elements in the non-steering or limited-steering direction (i.e., the φ-direction) is equipped with a single, high-quality phase shifter. In one embodiment, individual elements in each column (i.e., the φ-direction) are fed via an RF distribution structure such as a tapped delay line, corporate feed, or traveling wave structure that creates a desired "pre-programmed" phase and/or amplitude distribution between individual elements.

In another embodiment, reduced-complexity phase shifters allow for compensation of manufacturing tolerances of elements in the non-steering direction (i.e., the φ-direction). In yet another embodiment, reduced complexity phase shifters allow for small adjustments of individual elements in the non-steering direction (i.e., the φ-direction).

In some embodiments, columns of elements may be fed via an electromagnetic radiation distribution structure, such as an RF distributor like a tapped delay line, corporate feed, or traveling wave structure that creates a target "pre-programmed" phase and/or amplitude distribution between individual columns of elements. In another embodiment, reduced-complexity phase shifters are daisy-chained between elements and/or between columns of elements to achieve a desired overall phase distribution. For instance, reconfigurable antennas may be part of a network of distributed phase shifters.

In still other embodiments, columns or rows of elements may be fed via a switchable electromagnetic radiation distribution structure, such as an RF distributor, that can invert the pre-programmed phase and amplitude distribution. For example, feeding the structure from the left side of the array creates a beam toward the right, and feeding the structure from the right creates a beam toward the left side. In another embodiment, multiple elements may be grouped into sub-arrays (or tiles) that refract or reflect a beam to perform beam steering. Each tile or combination of tiles can control the relative phase-distribution and/or amplitude distribution. Such a configuration may allow for "quantized" beam steering that approximates a continuously steerable beam. Especially for many of the navigational constraint models described herein, quantized beam steering may provide indistinguishable functionality as compared to a system that provides continuous beam steering.

In other embodiments, individual elements and/or tiles may continuously generate and steer a beamform based on quantized phases. In such embodiments, a wireless power transmission system may generate and continuously steer a beamform with a non-ideal aperture distribution that only approximates an ideal beamform aperture distribution. The quantized-phase approach may reduce the cost and/or complexity of the wireless power transmission system, and yet still provide a sufficiently accurate aperture distribution for many of the navigational constraint models described herein.

One or more tiles may be daisy-chained and may have one or more RF feeds. For example, a feed may feed one column in the steering direction. In another embodiment, tiles with pre-set phase and/or amplitude distributions may be rotated or otherwise mechanically actuated to modify a beam. The array of tiles may be in communication with various power amplifiers and/or transmitters to achieve different power levels while maintaining efficiency. In some embodiments, amplitude control may be used to fine-tune and/or equalize the system for dynamic power control.

In various embodiments, the distribution of amplitude levels throughout multiple elements or tiles may be controlled during manufacturing and/or in real time to achieve "spatial windowing" to reduce sidelobes or grating lobes, and/or to achieve a specific beam profile. Elements and tiles may be grouped to minimize or at least reduce the number of phase shifters, variable gain or variable attenuation blocks, and/or complex components (that may be expensive). The reduction or minimization of such elements may reduce the functionality of the array. For instance, the array may have limited or no steering in one direction and/or have reduced focal range adjustment. However, for a given navigational constraint model, a wireless power transmission system with reduced functionality may be more than adequate. In various embodiments, phase shifters may control insertion loss and thus ensure flat insertion loss over the various phase states and/or act as controllable attenuators.

In some embodiments, a wireless power transmission system may utilize an asymmetric antenna design and/or asymmetric array design. In the steering direction (i.e., in the θ-direction), the antenna elements may have a low gain and are spaced at less than one wavelength apart (e.g., half-wavelength spacing) to reduce side lobes and/or grating lobes. In the non-steering direction (i.e., in the φ-direction), the same antenna elements may have a high gain and be spaced more than half a wavelength apart. For example, they may be spaced one or two wavelengths apart (or even more). In general terms, higher gain in the non-steering direction attenuates side lobes and grating lobes but limits the steering range. In many of the navigational constraint models described herein, steering is limited or not allowed at all in the non-steering direction (i.e., in the φ-direction). Accordingly, such an architecture can be employed without functionally limiting the ability of the wireless power transmission system to deliver wireless power to a mobile device on a prescribed path. In such embodiments, the gain may be independently optimized in the steering and non-steering (or limited-steering) directions.

The preceding paragraphs describe numerous optimization and simplification approaches for beamforming antennas for delivering power in navigational constraint models that limit mobile device travel to a prescribed path. While many of the embodiments are described as stand-alone embodiments herein, it is appreciated that any combination of two or more of the embodiments described herein may be utilized in the same wireless power transmission system and/or in various wireless power transmission systems operating within a network of wireless power transmission systems.

A wide variety of tunable multi-element transmitters may be used for the power transmitter. In some embodiments, a phased array antenna may be used for beamforming. In other embodiments, a tunable metasurface antenna may be used for the power transmitter. Elements of the tunable metasurface antenna may be tuned via one or more inputs to achieve a specific target beamform. Similarly, a receiver on the UAV may utilize a tunable metasurface antenna or other array (such as a phased array) to receive wireless power. The tunable metasurface antenna may include a plurality of subwavelength antenna elements that are spaced at subwavelength intervals, relative to an operating frequency.

A plurality of tunable impedance elements, tunable via control inputs, may be coupled to the plurality of antenna elements. Each unique permutation of impedance values may result in a unique beamform. Thus, a target beamform may be attained by adjusting or tuning the impedance values of the tunable metasurface of subwavelength tunable antenna elements. As described herein, multi-element transmitters with limited or tiled control may be employed that offer limited functionality that is suitable for a particular navigational constraint model.

Many of the examples described herein are provided in the context of an unmanned aerial vehicle (UAV). However, it is appreciated that the wireless power transmitters and wireless power transmission systems described herein can be utilized in conjunction with any of a wide variety of mobile devices, including portable electronics, unmanned aerial vehicles (UAVs), unmanned ground vehicles (UGVs), unmanned surface vehicles (USVs), and/or other moving devices that consume power. Accordingly, each example described herein and/or illustrated in one or more of the accompanying drawings that uses a UAV as an example should be understood as also being suitable for use with any other type of mobile device, potentially with minor adaptations. For instance, the illustrated examples in the drawings show wireless power transmission systems powering overhead UAVs in flight. However, similar wireless power transmission systems may be configured with steering angles suitable for powering UGVs on the ground.

In an interior application, wireless power transmission systems may be positioned overhead on a ceiling and power electronic devices traveling, for example, along a hallway beneath them. The mobile device may, for example, be an aerial or land-based drone, a robotic device, a delivery device, a service device, and/or other functionally autonomous or partially autonomous device benefits from wireless power transfer to provide power and/or supplement another power source.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc. that are described herein may be combined as a single system, subsystem, module, or component. Moreover, many of the systems, subsystems, components, and modules may be duplicated or further divided into discrete systems, subsystems, components or modules to perform subtasks of those described herein. Any of the embodiments described herein may be combined with any combination of other embodiments described herein. Many of the embodiments of the systems and methods described herein that appear to be mutually exclusive may be used in combination as weighted functions of one another and/or in primary-backup configurations in which one embodiment is used primarily, and the other embodiment is available as a backup.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable devices. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. Also, the steps of a method do not necessarily need to be executed in any specific order, or even sequentially, nor do the steps need to be executed only once.

In general, the function of a wireless power transmission system is to generate target radiation patterns in the near field that vary with distance. Many of the drawings described below depict approximations of gaussian beams with a narrow waist at the focal range. In some implementations, the shape of focused beams may be non-gaussian. For example, a wireless power transmission system may focus a non-gaussian beam that conforms to a target power density distribution for a particular receiver (e.g., to reduce spillover, maximize efficiency, prevent damage to the receiver, etc.).

FIG. 1A illustrates an example 100 of a wireless power transmission system 110 with a relatively wide steering angle in the θ-direction for use in a navigational constraint model that limits travel by a mobile device 150 along a fixed, one-dimensional path 130 at a fixed distance corresponding to the fixed focal range of the wireless power transmission system 110. As illustrated, a wireless power transmission system 110, configured according to any combination of the various embodiments described herein for the particular navigational constraint model, may allow for wide beam steering between a first angle 120 and a second angle 125 in the θ-direction. For example, a wireless power transmission system 110 may allow for a 60-degree, 90-degree, or 120-degree beam steering between in the θ-direction.

The simplified wireless power transmission system 110 may not allow for changes in the focal range. Accordingly, the mobile device 150 (e.g., a UAV) may travel along a prescribed one-dimensional path 130 at a fixed distance (i.e., fixed focal range) from the wireless power transmission system 110.

Figure 1B:
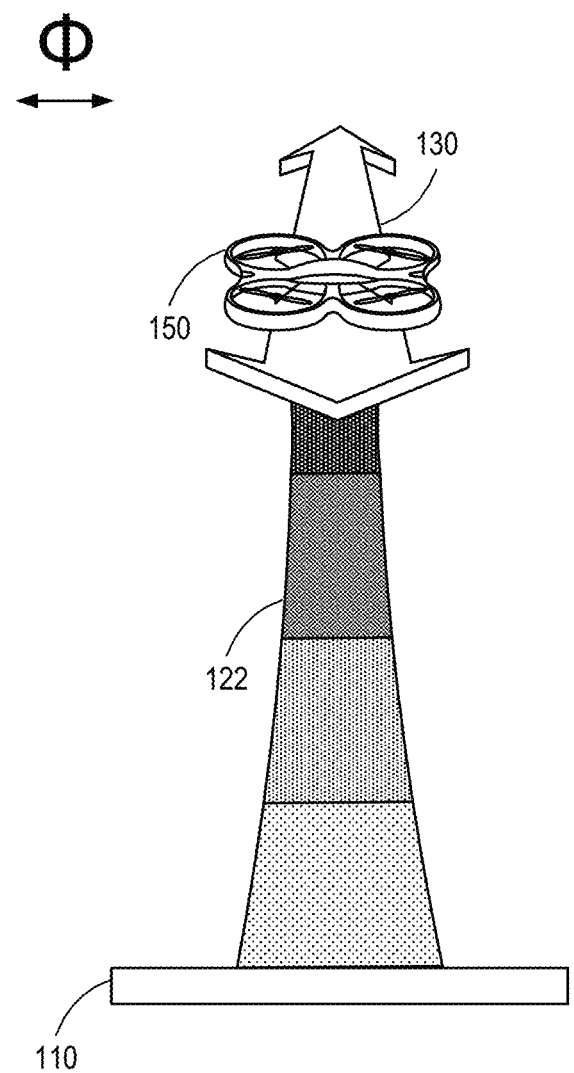
FIG. 1B illustrates the lack of any steering in the φ-direction by the wireless power transmission system of FIG. 1A, according to one embodiment.

FIG. 1B illustrates the lack of any steering in the ϕ-direction by the wireless power transmission system 110 of FIG. 1A. The navigational constraint model allows for the mobile device 150 to travel on a one-dimensional flight path 130 at a fixed distance from the wireless power transmission system 110. A wireless power beamform 122 is shown providing wireless power to the mobile device 150. As illustrated, with no steering in the ϕ-direction, the mobile device 150 must remain within the width of the wireless power beamform 122.

In some embodiments, to maximize the power transmitted to the mobile device 150, the wireless power beamform 122 may be focused to correspond to the width of the wireless power receiver on the mobile device 150. In other embodiments, the width of the wireless power beamform 122 may be intentionally made wider than the receiver on the mobile device 150 to allow for some movement by the mobile device 150 in the ϕ-direction. Such an accommodation may reduce the efficiency of the power transfer and/or result in undesirable spillover.

Figure 1C:
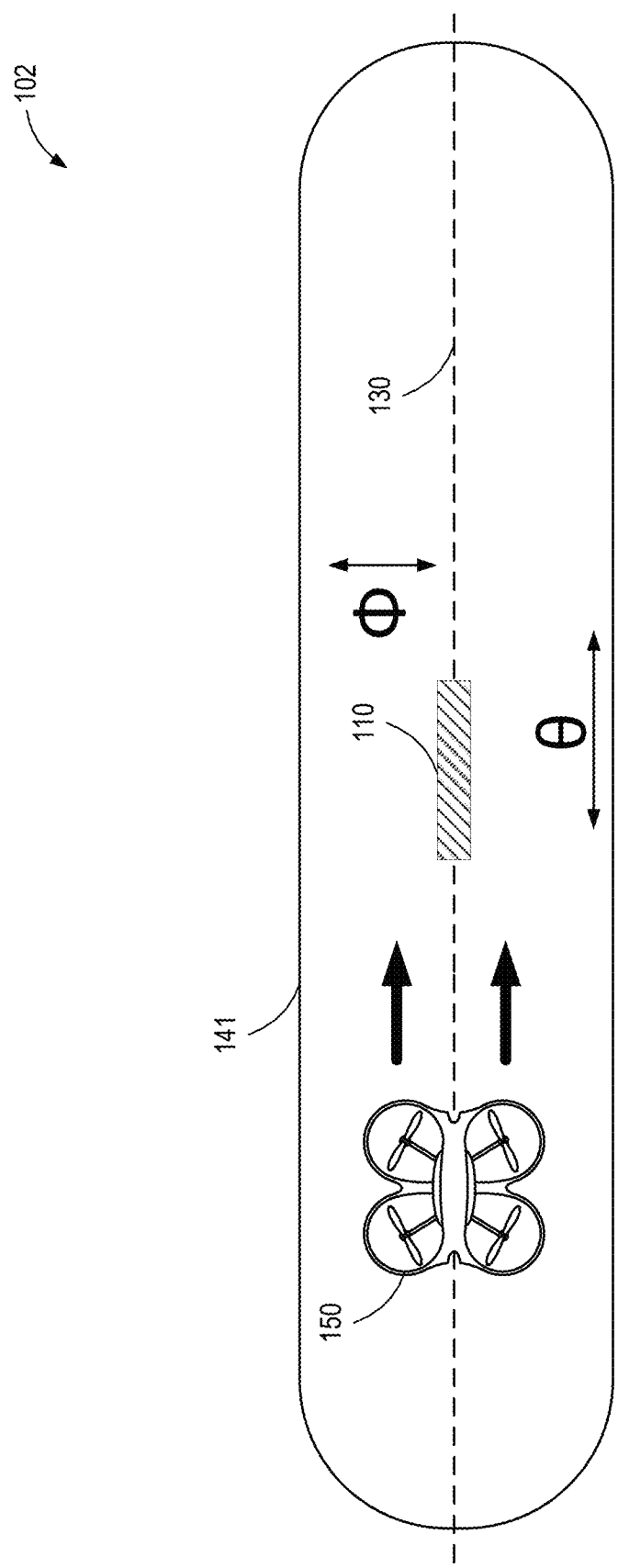
FIG. 1C illustrates a top view of the wireless power transmission system in FIGS. 1A and 1B, according to one embodiment.

FIG. 1C illustrates a top view 102 of the wireless power transmission system 110 in FIGS. 1A and 1B. As illustrated, the rectangular region 141 illustrates the possible steering angle of a wireless power beamform in the θ-direction and one possible embodiment of the width of the wireless power beamform in the ϕ-direction. In the top view 102, the mobile device 150 travels along the prescribed path 130 at a fixed distance from the wireless power transmission system 110.

Figure 2:
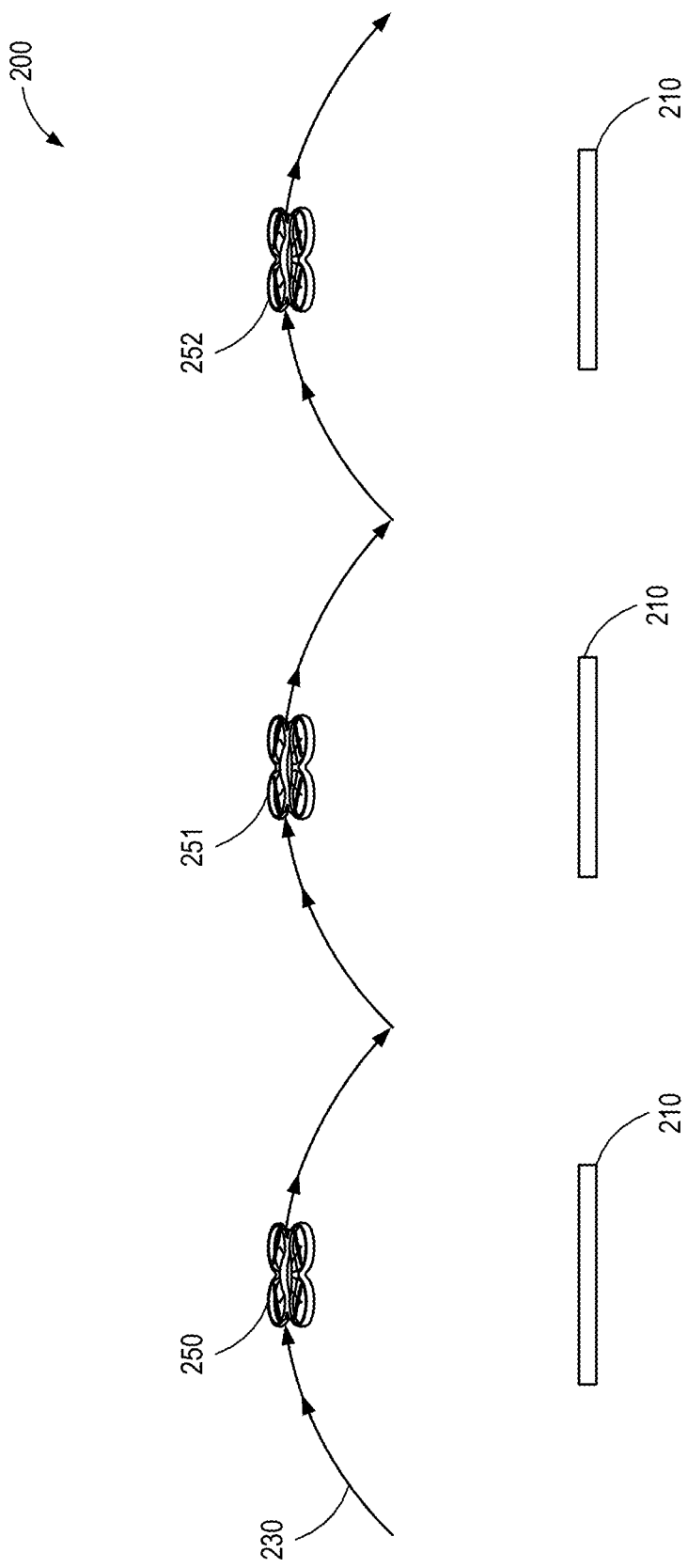
FIG. 2 illustrates an example of a network of wireless power transmission systems implementing the navigational constraint model that limits travel along a fixed, one-dimensional (or quasi-one-dimensional) path at a fixed distance corresponding to a fixed focal range of the wireless power transmission system.

FIG. 2 illustrates a network 200 of wireless power transmission systems 210 implementing a navigational constraint model that limits travel along a fixed, one-dimensional (or quasi-one-dimensional) path 230 at a fixed distance from the wireless power transmission systems 210. Such a navigational constraint model may require a navigational path 230 that resembles a series of arcs connected end to end. While such a travel path may not be the shortest possible path from one point to another, it allows for relatively simple wireless power transmission systems 210 that do not allow for beam steering in one direction or any focal range adjustments.

The distance between the wireless power transmission systems 210 may vary based on the available steering angle in the steering direction. In some embodiments, a minimum target altitude for the mobile devices 250 may dictate a closer spacing of the wireless power transmission systems 210. In other embodiments, the wireless power transmission systems 210 may be spaced farther apart and require the mobile device 250 to utilize a battery (or another on-board power system) between the maximum possible steering angles between adjacent wireless power transmission systems 210.

Figure 3:
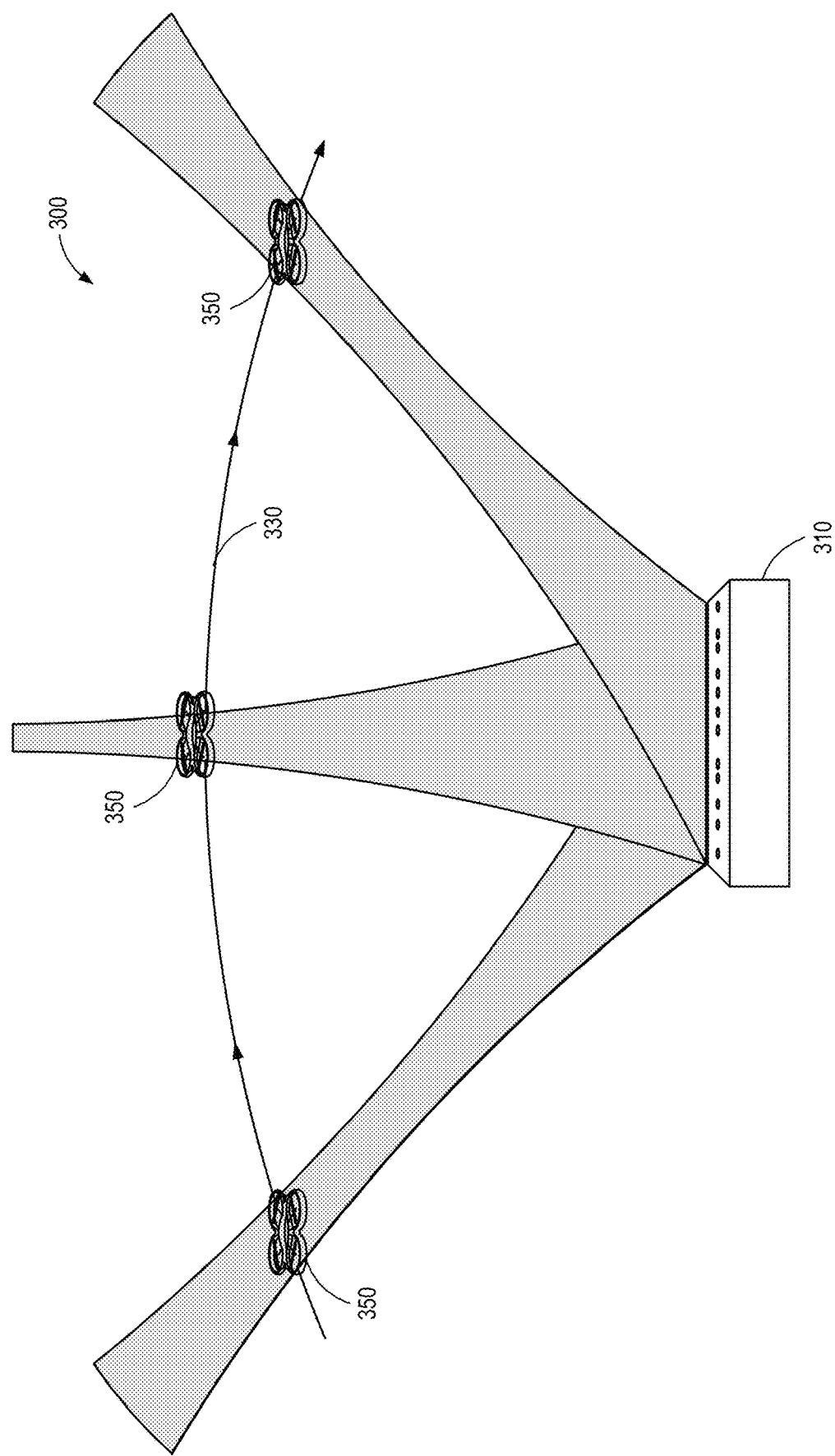
FIG. 3 illustrates an example of a leaky waveguide embodiment of a wireless power transmission system to implement a navigational constraint model that limits travel along a fixed, one-dimensional path at a fixed distance corresponding to a fixed focal range of the wireless power transmission system.

FIG. 3 illustrates an embodiment of a wireless power transmission system 300 to implement a navigational constraint model that limits travel along a fixed, one-dimensional path 330 at a fixed distance. In the illustrated embodiment, a driver drives a frequency- and/or magnitude-adjustable signal into a leaky waveguide 310 that has a series of gratings or apertures. Each frequency of the drive signal may correspond to a unique beam steering angle.

Figure 4A:
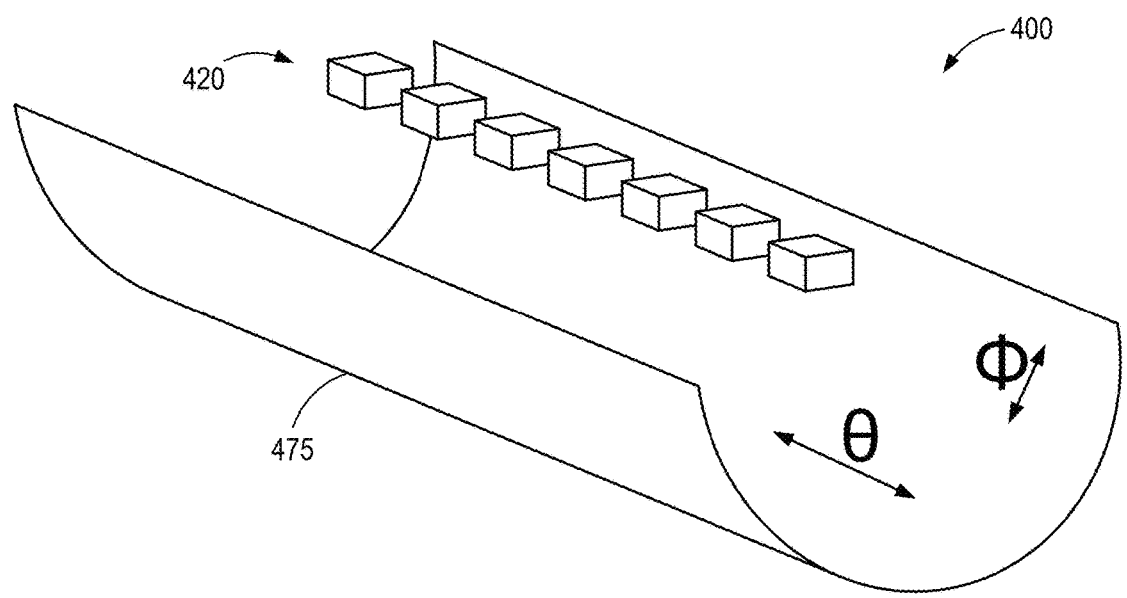
FIG. 4A illustrates an example of an elongated ellipsoidal power transmission system to implement a navigational constraint model that limits travel along a fixed, one-dimensional path at a fixed distance corresponding to a fixed focal range of the wireless power transmission system.

FIG. 4A illustrates an elongated ellipsoidal power transmission system 400 to implement a navigational constraint model that limits travel along a fixed, one-dimensional path at a fixed distance. Many embodiments of the wireless power transmission systems described herein may be embodied as the elongated ellipsoidal power transmission system 400. In such embodiments, a plurality of adjustable or tunable transmitter elements 420 may be arranged in a one-dimensional array in the direction of the steering angle (i.e., in the θ-direction).

The one-dimensional array of transmitter elements 420 may be driven to allow for beam steering in the θ-direction. The beamform produced by the elongated ellipsoidal power is constrained in the non-steering angle (i.e., in the ϕ-direction) by the elongated ellipsoid reflector 475. In the illustrated embodiment, the elongated ellipsoid reflector 475 provides a fixed focal range and no steering in the ϕ-direction.

Many of the embodiments described herein utilize an ellipse or ellipsoidal reflector to focus a beamform. Wireless power transmission systems may utilize reflectors of various shapes to attain a wide variety of target beamform focus shapes. For instance, various reflector shapes (physical or planar equivalents) may be utilized to attain specific beamform shapes. For example, a receiver on a mobile device may be ring-shaped. In such an embodiment, the wireless power transmission system may utilize a reflector shape that produces a beamform with a corresponding ring-shaped beamform focus. Thus, for each embodiment described herein, it is appreciated that various shapes and sizes of transmitter elements and/or reflectors may be utilized to a attain a particular beamform shape, beamform focus, and/or beamform focus size.

Figure 4B:
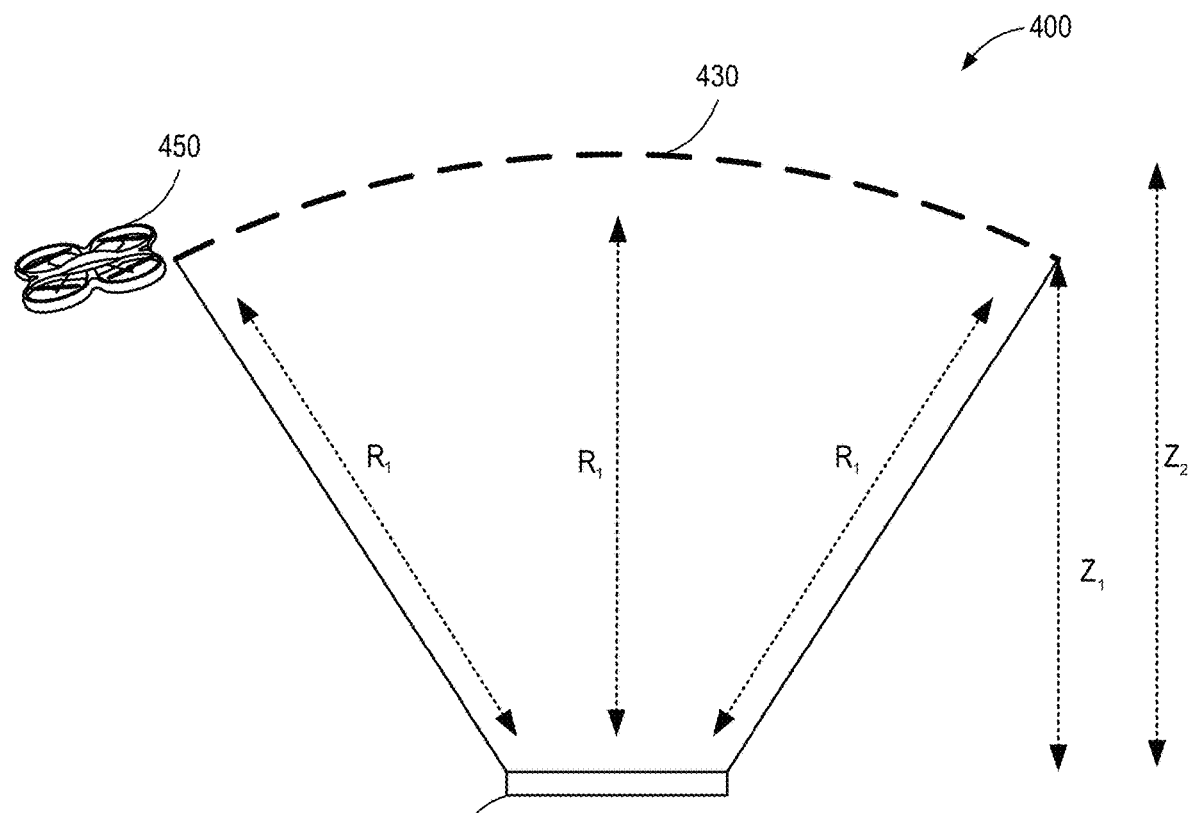
FIG. 4B illustrates the constant focal range of the elongated ellipsoidal power transmission system of FIG. 4A that results in the mobile device changing elevation as it navigates the prescribed path, according to one embodiment.

FIG. 4B illustrates the constant focal range ($R_1$) of the elongated ellipsoidal power transmission system 400 of FIG. 4A that results in the mobile device 450 changing elevation ($Z_1$ and $Z_2$) as it navigates the prescribed path 430.

Figure 5:
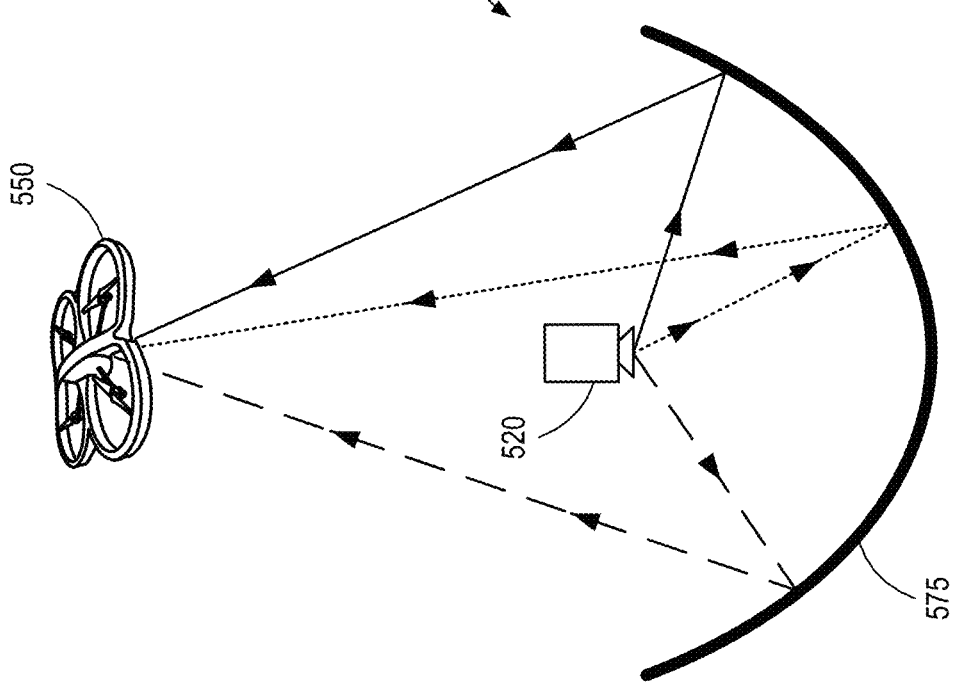
FIG. 5 illustrates a functional diagram of reflected power being focused by a cross-section of an elongated ellipsoidal power transmission system, according to one embodiment.

FIG. 5 illustrates a functional diagram of reflected power being focused by a cross-section of an elongated ellipsoidal power transmission system 500. An elongated ellipsoidal reflector 575 reflects power from an array of transmitter elements 520 to a mobile device 550. As the mobile device 550 travels along the prescribed path (in to and out of the page), the array of transmitter elements 520 is phase-controlled to steer the wireless power beamform to the mobile device 550. The ellipsoidal reflector 575 constrains the wireless power beamform to the left and right without allowing for any beam steering in the φ-direction.

Figure 6:
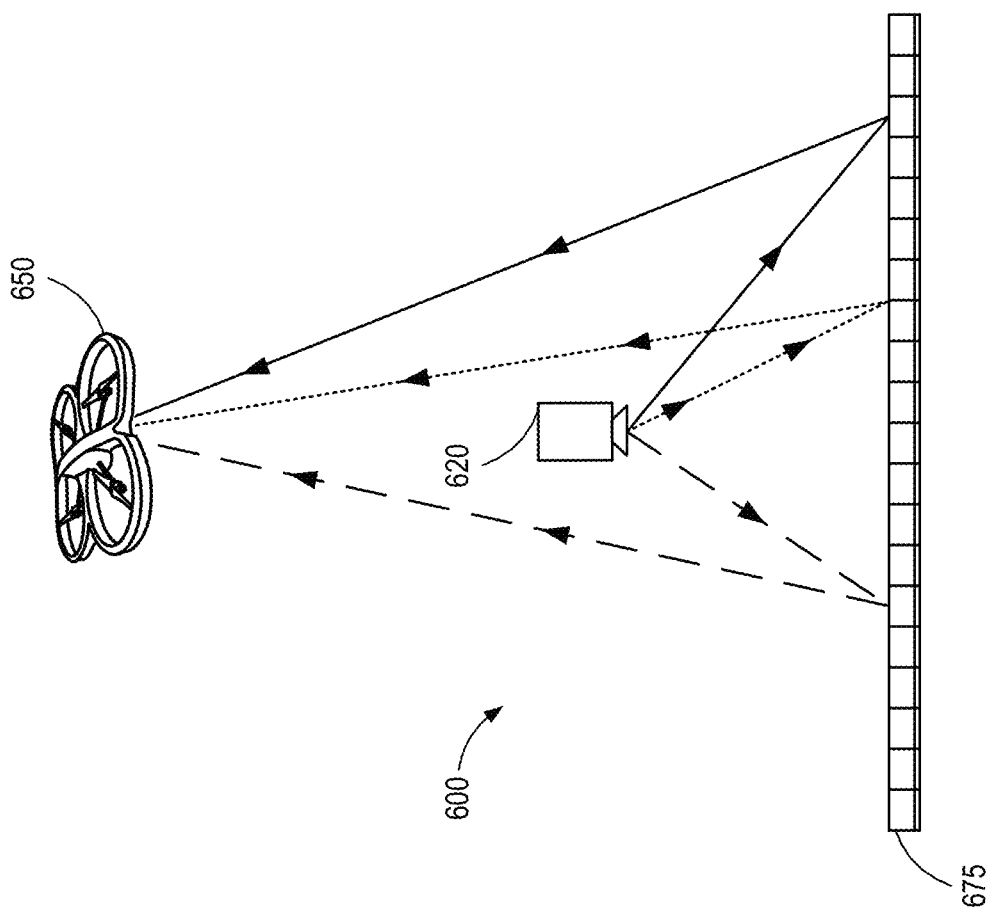
FIG. 6 illustrates an example of an array equivalent of the elongated ellipsoidal power transmission system to implement the navigational constraint model that limits travel along a fixed, one-dimensional path at a fixed distance corresponding to a fixed focal range of the wireless power transmission system.

FIG. 6 illustrates a cross-section of the array equivalent 675 of the elongated ellipsoidal power transmission system in FIG. 5 to implement the navigational constraint model that limits travel along a fixed, one-dimensional path at a fixed distance. The array 675 comprises one or more fixed elements or tiles of elements and could be embodied, for example, by reflective surfaces (e.g., reflect-arrays) or phased-array architectures. Thus, for a given bandwidth, the array 675 may be configured as the functional equivalent (or as a discretized functional equivalent) of the elongated ellipsoidal reflector 575 of FIG. 5.

While fully tunable and controllable phased arrays and metasurfaces are available that would allow for full beamforming in all directions, and at varying focal ranges, these devices are relatively complex and include expensive components. A static or partially-tunable array or metasurface (e.g., only by row or only by column) is relatively less complex, cheaper to construct, and may be more reliable, durable, and/or offer other favorable characteristics.

Figure 7:
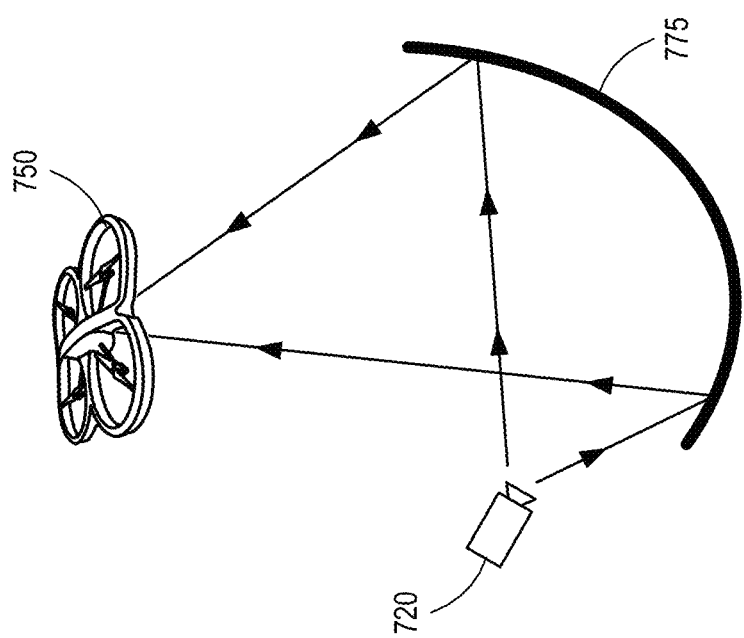
FIG. 7 illustrates an example of a cross-section of an offset embodiment of the elongated ellipsoidal power transmission system that is functionally similar to that of FIG. 5, but without blocking part of the antenna aperture.

FIG. 7 illustrates a cross-section of an offset embodiment of the elongated ellipsoidal power transmission system that is functionally similar to that of FIG. 5, but without blocking part of the antenna aperture. As illustrated, incident beams from the array of transmitter elements 720 at one focus are reflected by the elongated ellipsoidal reflector 775 to the mobile device 750.

Figure 8:
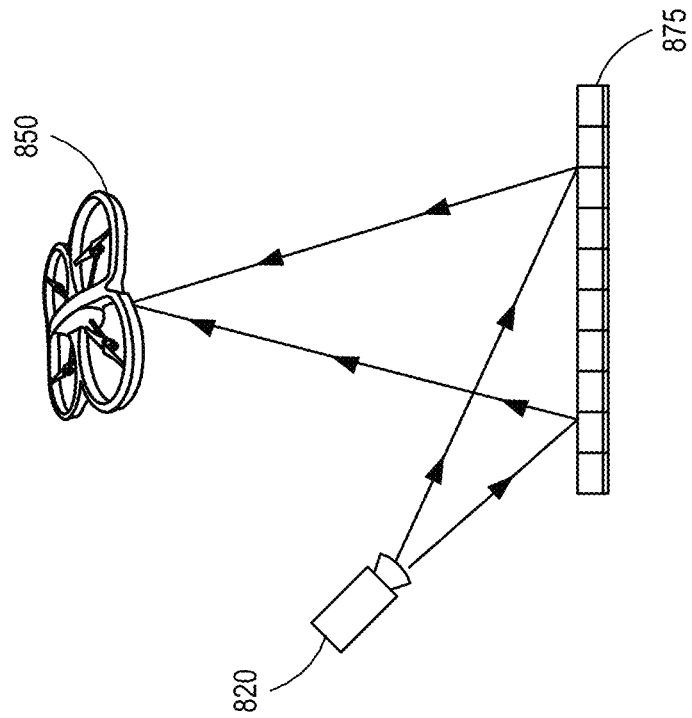
FIG. 8 illustrates an array equivalent of the offset embodiment of the elongated ellipsoidal power transmission system of FIG. 7, according to one embodiment.

FIG. 8 illustrates a cross-section of an array equivalent 875 of the offset embodiment of the elongated ellipsoidal power transmission system of FIG. 7. An array of transmitter elements 820 may transmit wireless power signals to the array 875 for reflection to the mobile device 850. As in FIG. 7, offsetting the transmitter elements 820 from the transmit aperture may reduce aperture obstructions for improved wireless power transmission.

Figure 9:
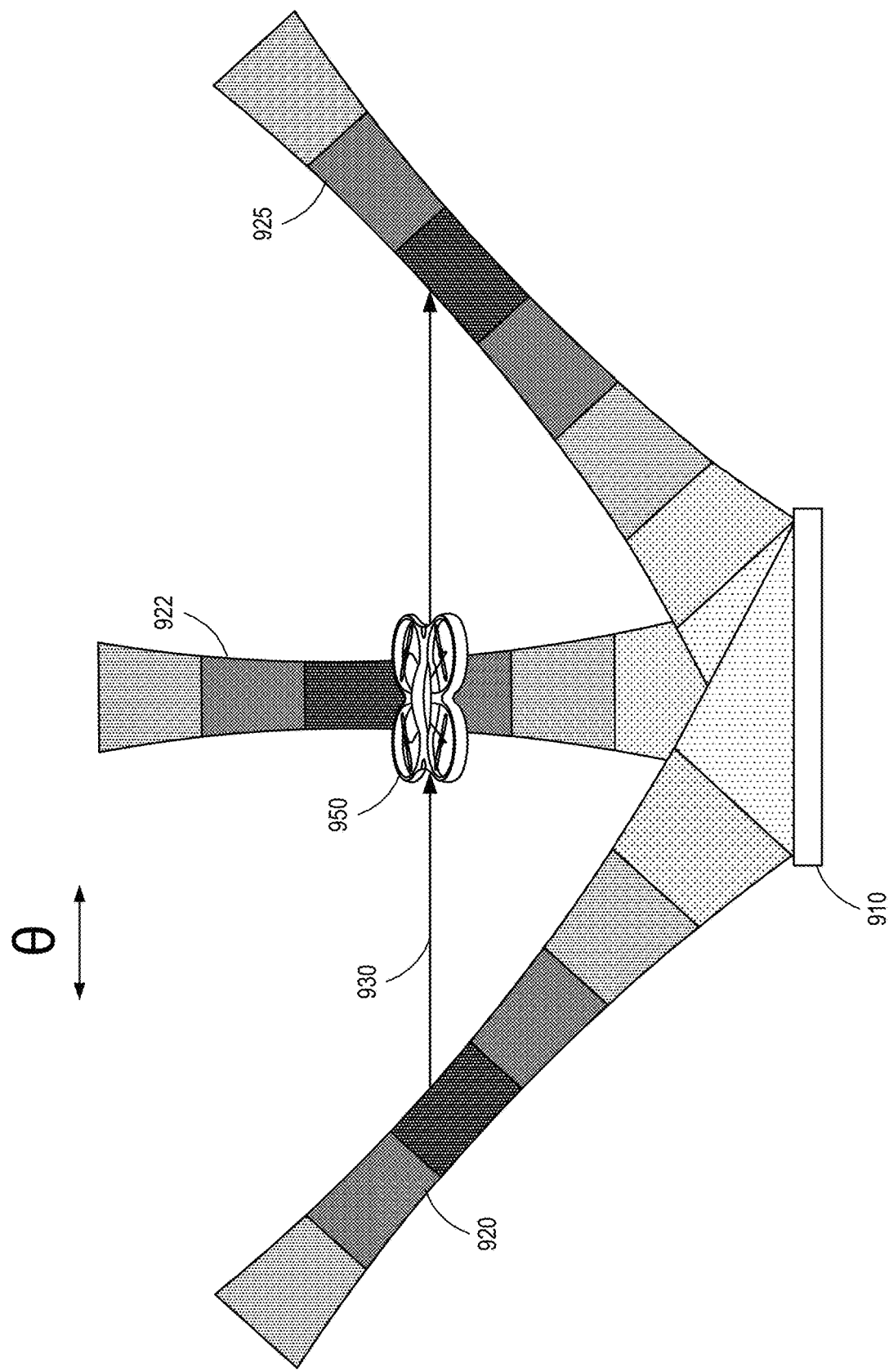
FIG. 9 illustrates an example of a wireless power transmission system with a relatively wide steering angle in the θ-direction for use in a navigational constraint model that limits travel at a fixed altitude, such that the focal range changes based on the steering angle.

FIG. 9 illustrates an example of a wireless power transmission system with a relatively wide steering angle in the θ-direction for use in a navigational constraint model that limits travel along a path 930 at a fixed altitude, such that the focal range changes based on the steering angle. A wireless power transmission system 910 allows for beamforming between a first angle 920, a second angle 922, and a third angle 925. The mobile device 950 travels a prescribed path 930 that maintains a constant altitude. Because the altitude is constant, the focal range (distance between the wireless power transmission system 910 and the mobile device 950) is variable based on the steering angle.

As described above, the focal range is predetermined for each steering angle. Accordingly, a static antenna architecture can be employed that provides the correct focal range for each steering angle. A static architecture that provides different focal ranges based on steering angle is, in many instances, less complex and cheaper than antenna architectures that allow for unconstrained focal ranging that is independent of steering angle.

Figure 10A:
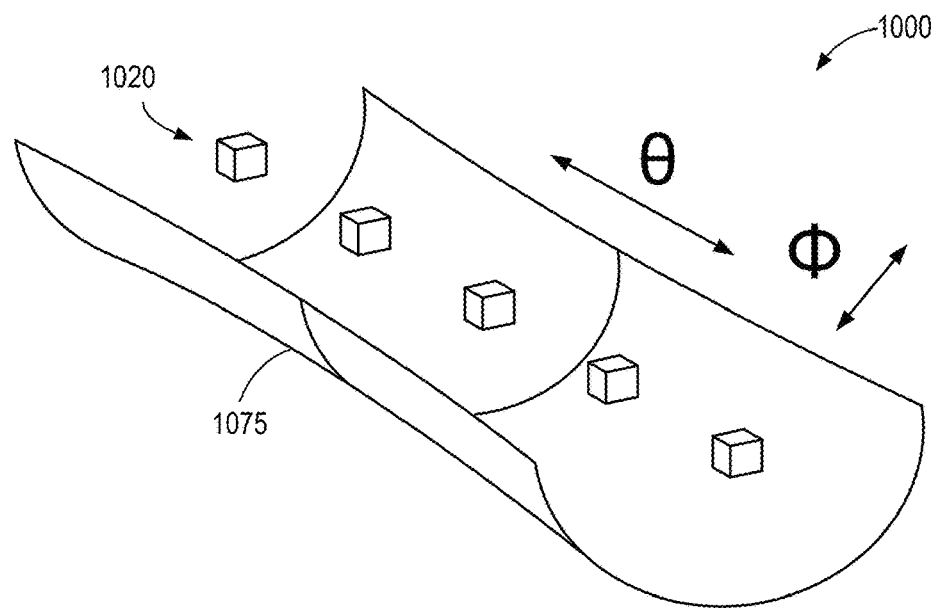
FIG. 10A illustrates an example of an elongated ellipsoidal power transmission system with flared ends configured to provide fixed focal ranges as a function of steering angle, allowing for a mobile device to travel at a fixed altitude.

FIG. 10A illustrates an elongated ellipsoidal power transmission system 1000 with flared ends configured to produce a beam with a focal range that varies as a function of steering angle. For instance, the focal range at each steering angle may be configured to correspond to a fixed altitude, thereby allowing a mobile device to navigate at a fixed altitude.

As illustrated, a one-dimensional array of transmitter elements 1020 extends in the direction of the steering angle (θ-direction) to allow for phased-array steering along the prescribed path of travel. The narrowest portion of the flared ellipsoidal reflector 1075 has the shortest focal range, while the flared ends of the flared ellipsoidal reflector 1075 have the longest focal range. The flared shape is calculated to ensure that for each possible steering angle, the focal range corresponds to the same elevation.

Figure 10B:
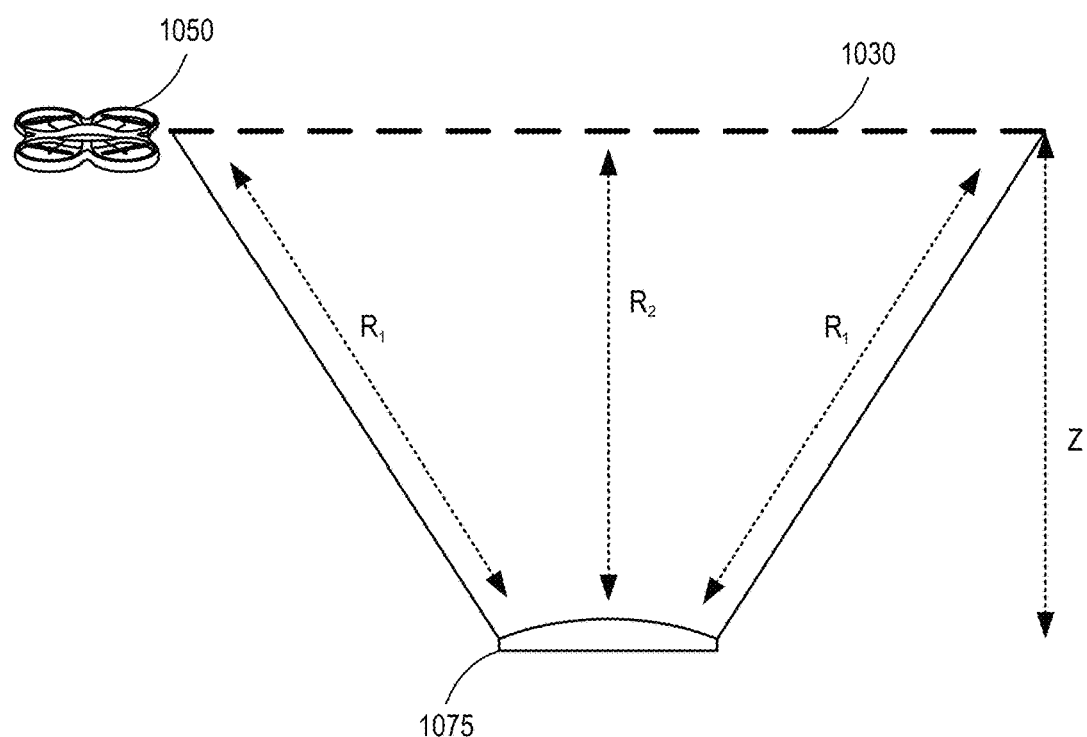
FIG. 10B illustrates the elongated ellipsoidal power transmission system of FIG. 10A implementing a navigational constraint model that limits travel along a fixed, one-dimensional path at a fixed altitude, according to one embodiment.

FIG. 10B illustrates the elongated ellipsoidal power transmission system 1075 of FIG. 10A implementing a navigational constraint model that limits travel along a fixed, one-dimensional path 1030 at a fixed altitude (Z). As illustrated, at high steering angles, $R_1$ represents the distance between the mobile device 1050 and the elongated ellipsoidal power transmission system 1075. The shortest focal range ($R_2$) to the mobile device 1050 is directly above the elongated ellipsoidal power transmission system 1075.

Figure 11:
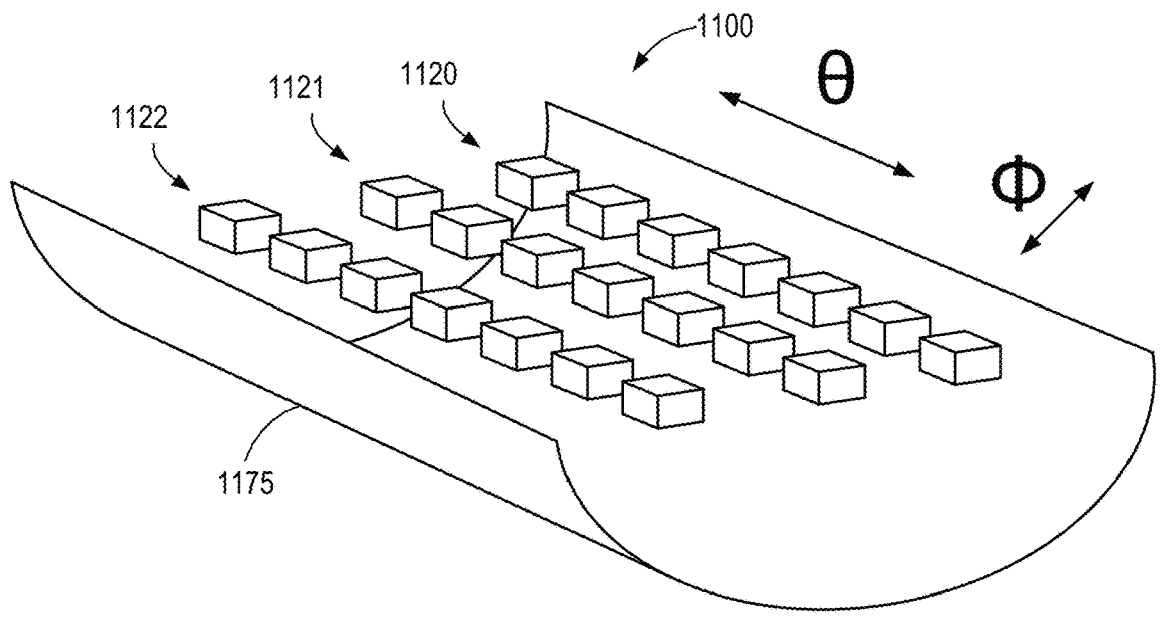
FIG. 11 illustrates an example of an elongated ellipsoidal power transmission system with a two-dimensional array of antenna elements to provide for limited beam steering in the φ-direction for mobile devices at a fixed distance corresponding to a fixed focal range of the wireless power transmission system.

FIG. 11 illustrates an elongated ellipsoidal power transmission system 1100 with a two-dimensional array of antenna elements (e.g., rows 1120, 1121, and 1122) to provide for limited beam steering in the φ-direction and/or limited focal range control for mobile devices traveling at an approximately fixed distance. The elongated ellipsoidal power transmission system 1100 includes an elongated ellipsoidal reflector 1175 that constrains the wireless power beamform in the φ-direction, facilitates limited control of the focal range, and/or limited control of the focus shape.

The limited array in the φ-direction, which may have element spacings greater than half of a wavelength (e.g., between half-wavelength and multiple wavelengths), allows for limited steering in the φ-direction. The number of transmitter elements in the φ-direction is shown as three, but this is simply an example for illustration purposes and may be more or less in practice. The inter-element spacing of the transmitter elements in the θ-direction may, for example, be between one-half wavelength and one wavelength, while the inter-element spacing of transmitter elements in the φ-direction is generally greater than the inter-element spacing in the θ-direction.

Figure 12:
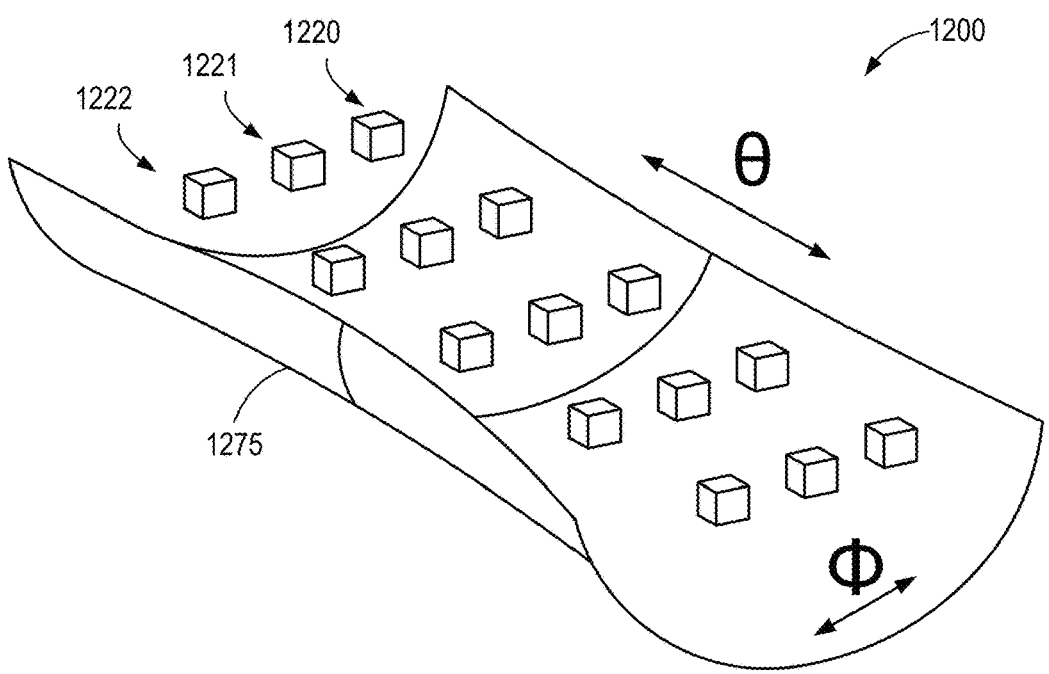
FIG. 12 illustrates another example of an elongated ellipsoidal power transmission system with flared ends and a two-dimensional array of antenna elements to provide for limited beam steering in the φ-direction for mobile devices at a fixed altitude.

FIG. 12 illustrates another elongated ellipsoidal power transmission system 1200 with flared ends. A two-dimensional array of antenna transmitter elements 1220, 1221, and 1222 may function similar to that in FIG. 11. Specifically, the two-dimensional array may allow for limited steering in the φ-direction and/or limited focal range adjustments at various steering angles. The elongated ellipsoidal reflector 1275 acts to constrain the wireless power transmitted in the φ-direction. The flared ends of the elongated ellipsoidal reflector 1275 correspond to varying focal lengths of the wireless power beamform at each respective steering angle to allow for a navigation path of a mobile device at a fixed altitude.

Figure 13A:
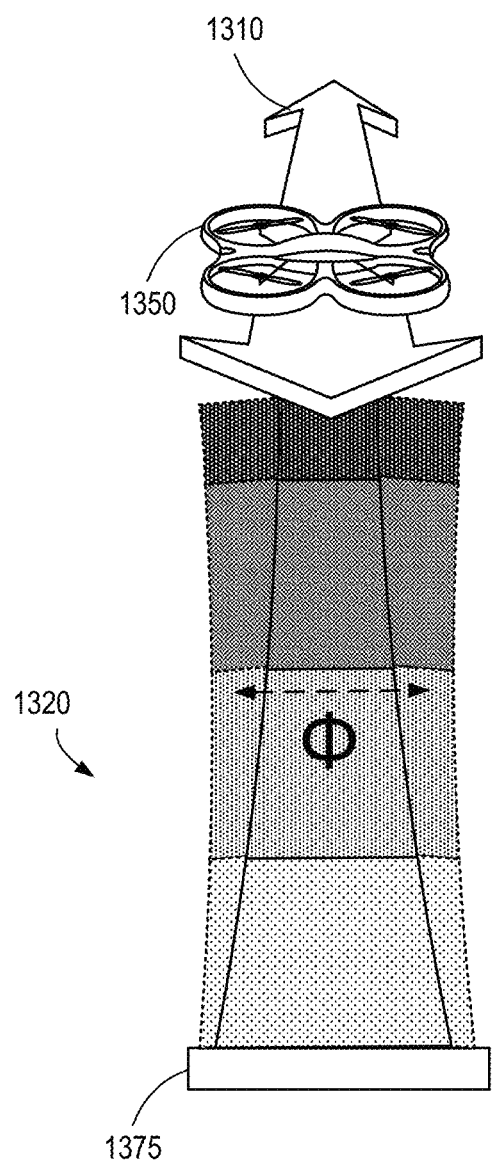
FIG. 13A illustrates a wireless power transmission system with limited beam steering in the φ-direction, according to one embodiment.

FIG. 13A illustrates a wireless power transmission system 1375 with limited (e.g., non-zero in this case) beam steering in the φ-direction. The wireless power beam 1320 is shown with three possible positions representing the extremes of the possible steering angles for providing wireless power to a mobile device 1350 along a prescribed path 1330 (into and out of the page). For example, the wireless power transmission system 1375 may provide a steering angle between, for example, 60 and 150 degrees along the navigation path. In contrast, the wireless power transmission system 1375 may provide limited beam steering of, for example, only 5-15 degrees in the φ-direction.

Figure 13B:
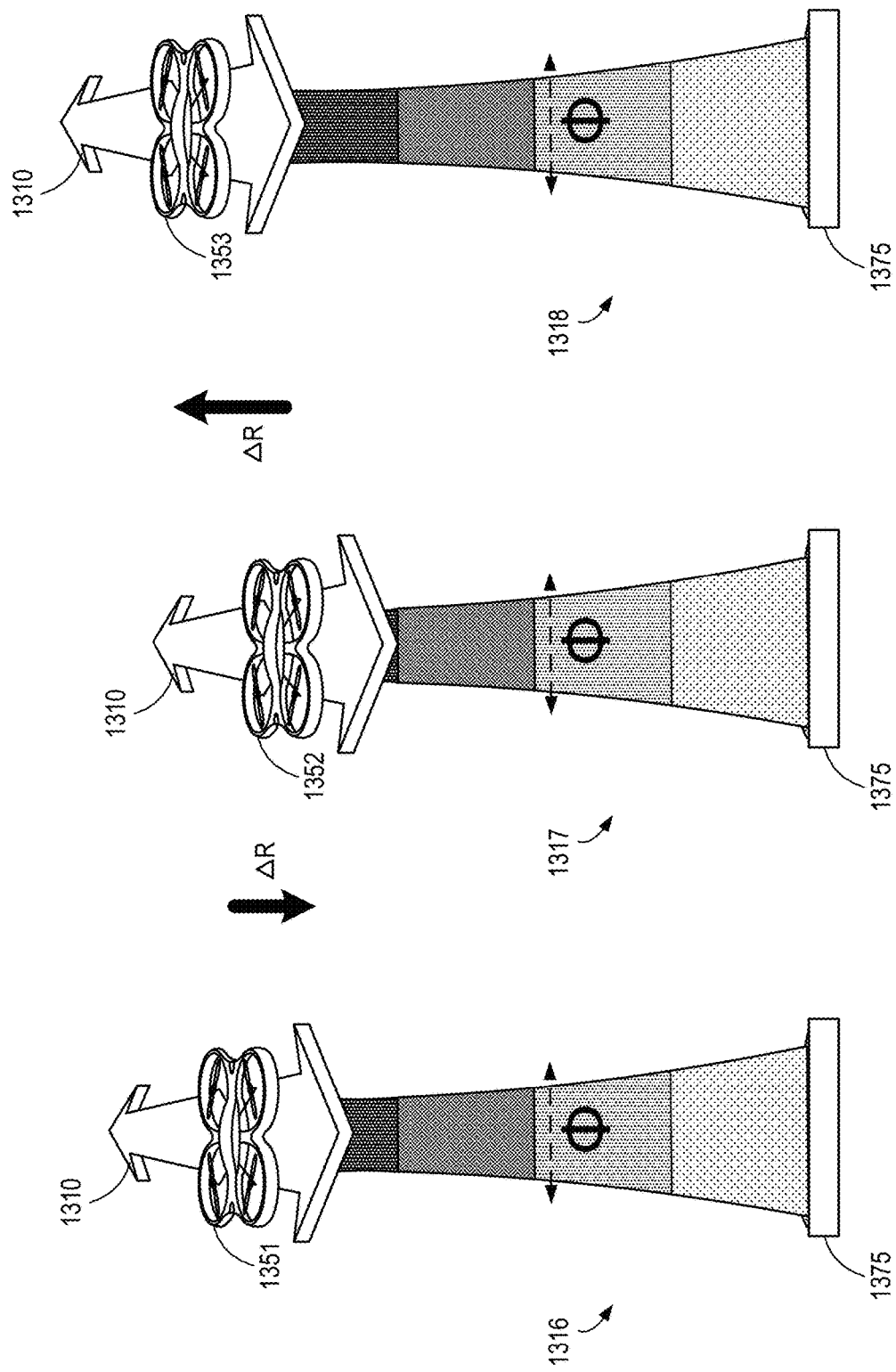
FIG. 13B illustrates the wireless power transmission system with limited (e.g., non-zero) focal range control at a specific steering angle, according to one embodiment.

FIG. 13B illustrates the wireless power transmission system 1375 with limited (e.g., non-zero) focal range control at a specific steering angle. A wireless power beam 1316 is shown at a first focal range for the mobile device 1351 traveling at a fixed elevation. The wireless power transmission system 1375 utilizes its limited focal range control to decrease the focal range and produce a wireless power beam 1317 in response to the mobile device 1352 moving downward slightly. The wireless power transmission system 1375 again utilizes its limited focal range control to increase the focal range and produce a wireless power beam 1318 in response to the mobile device 1353 moving upward.

Figure 13C:
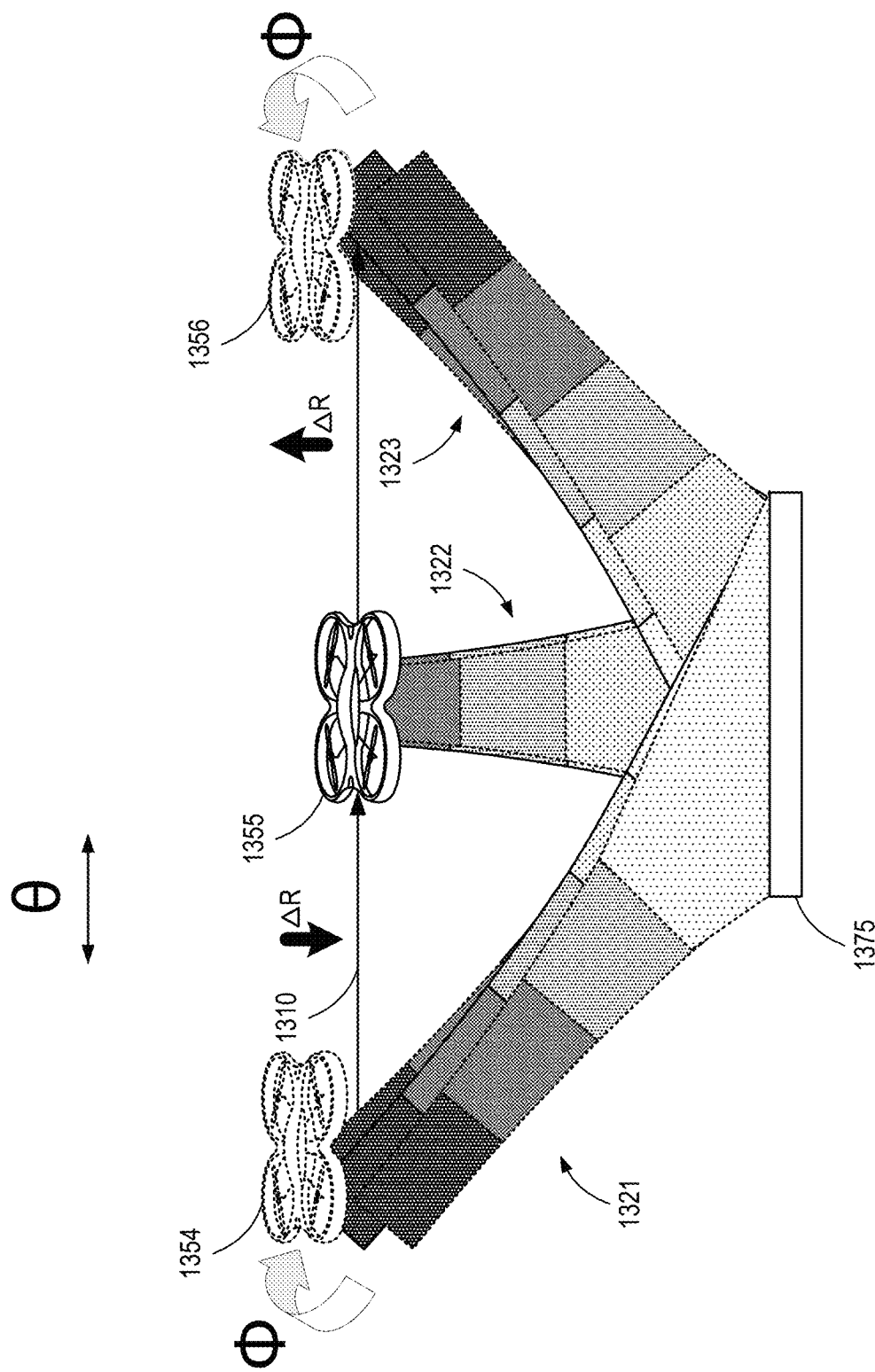
FIG. 13C illustrates the wireless power transmission system with wireless power beams at various steering angles with limited focal range adjustment capabilities, according to one embodiment.

FIG. 13C illustrates the wireless power transmission system 1375 with wireless power beams 1321, 1322, and 1323 at various steering angles with limited focal range adjustment. As the mobile device 1354 moves in the θ-direction at a substantially fixed elevation to locations 1355 and 1356, it may move up and down or side to side with some small variation as it navigates. At each steering angle 1321, 1322, and 1323, dashed lines are shown to represent the limited beam steering in the φ-direction into and out of the page. Similarly, at each steering angle 1321, 1322, and 1323, the wireless power transmission system 1375 utilizes its limited ability to adjust the focal range to account for variations in the elevation of the mobile device 1354 as it imperfectly travels (e.g., travels with small variations of a few inches or a few feet) along the prescribed path.

Figure 14:
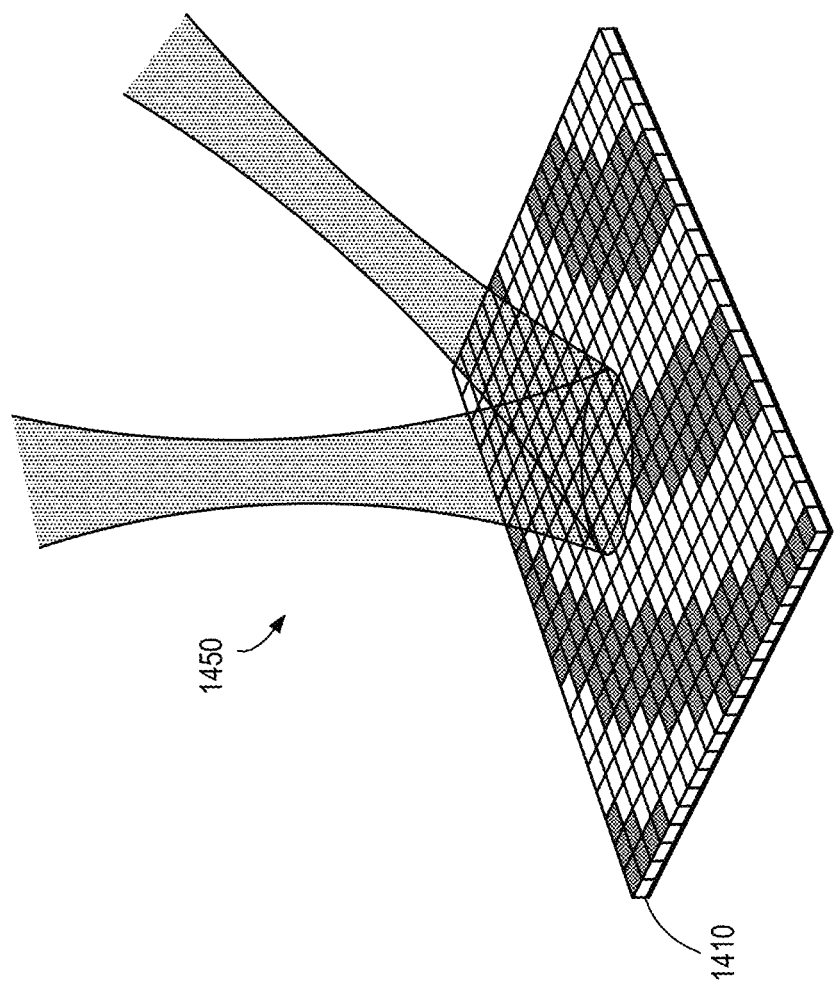
FIG. 14 illustrates a fully tunable surface reflector that allows for two-dimensional beam steering with an adjustable focal range, according to one embodiment.

FIG. 14 illustrates a fully tunable array 1410 (e.g., a phased array or metamaterial array) that allows for two-dimensional beam steering with an adjustable focal range, at 1450. While such a device may be employed in many of the navigational constraint models discussed herein, the fully tunable array 1410 is relatively expensive and may not be necessary for some navigational constraint models. The array 1410 may still provide sufficient functionality for many navigational constraint models with reduced functionality and a reduced number of control inputs.

Figure 15A:
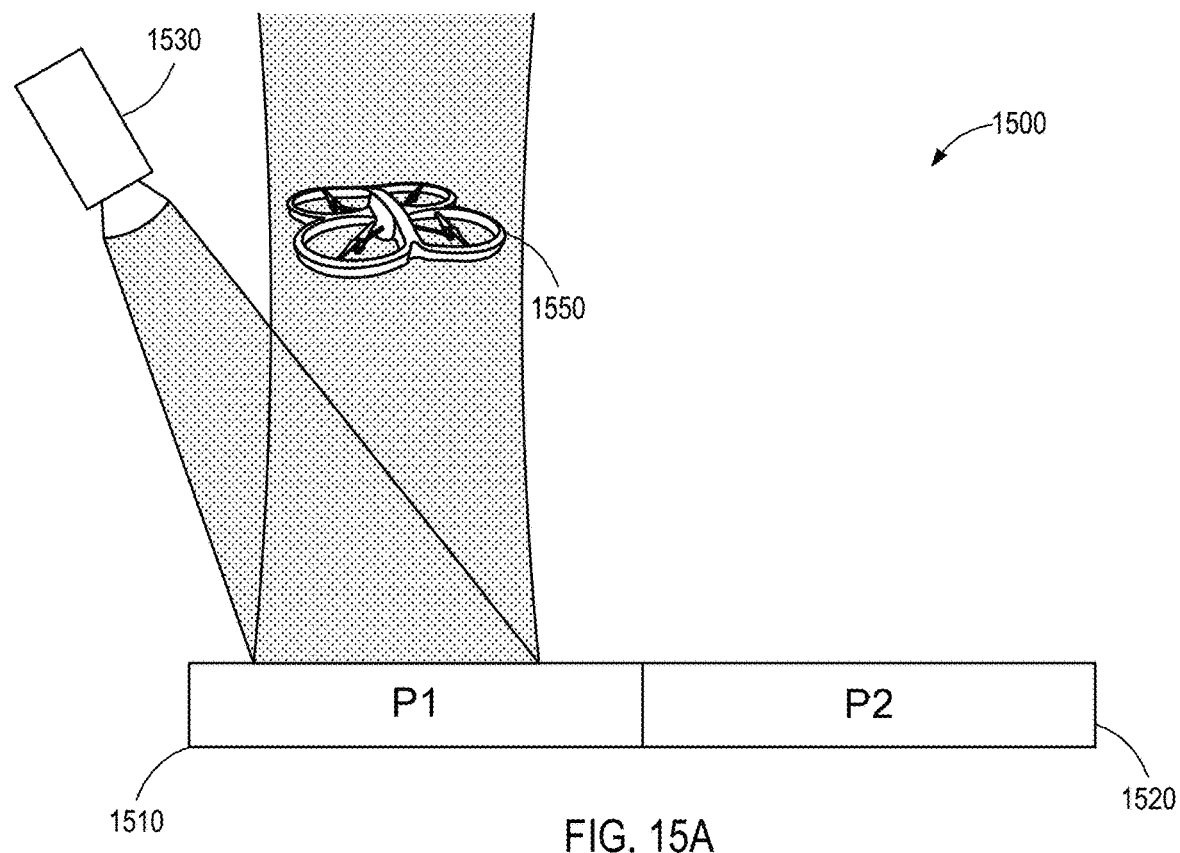
FIG. 15A illustrates a cross-section of a planar wireless power transmission system with dual static reflectors with transmitter element illuminating a first static reflector, according to one embodiment.

FIG. 15A illustrates a cross-section of a planar wireless power transmission system 1500 with dual static reflectors of a transmitter element 1530 illuminating a first static reflector 1510 to produce a relatively narrow beam for providing wireless power to a mobile device 1550 with a smaller wireless power receiver.

Figure 15B:
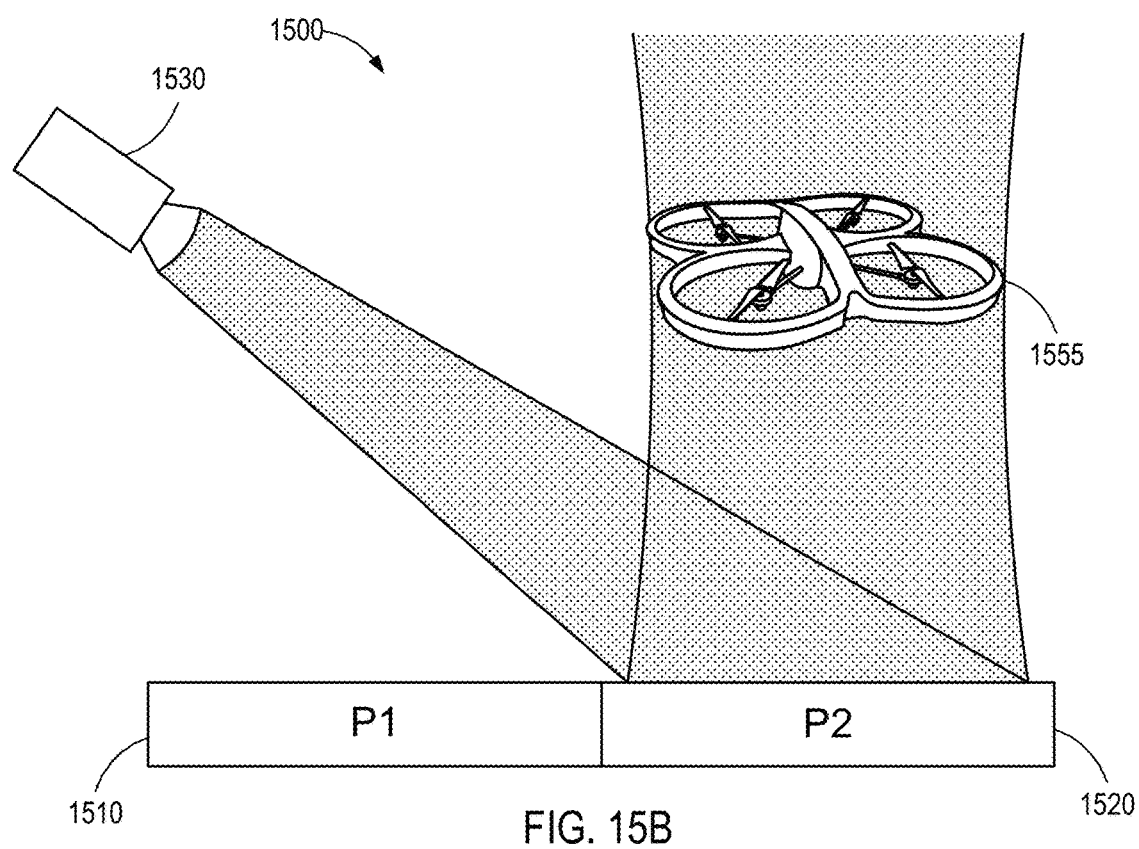
FIG. 15B illustrates a cross-section of the planar wireless power transmission system of FIG. 15A with transmitter element illuminating a second static reflector, according to one embodiment.

FIG. 15B illustrates a cross-section of the planar wireless power transmission system 1500 of FIG. 15A with the transmitter element 1540 illuminating a second static reflector 1520 to produce a relatively wide beam for providing wireless power to a smaller or closer mobile device 1555. As shown in FIGS. 15A and 15B, multiple reflectors 1510 and 1520 may be utilized to selectively switch between two statically available beam form patterns. In other embodiments, additional static reflectors may be addressed by mechanical movement of the transmitter element 1540. Any number of reflectors may be available along the non-steering or steering direction of the wireless power transmission system 1500. The different reflectors may correspond to different beam steering angles, different spot sizes of the focused beam, different focal ranges, and/or other beam characteristics.

Figure 16:
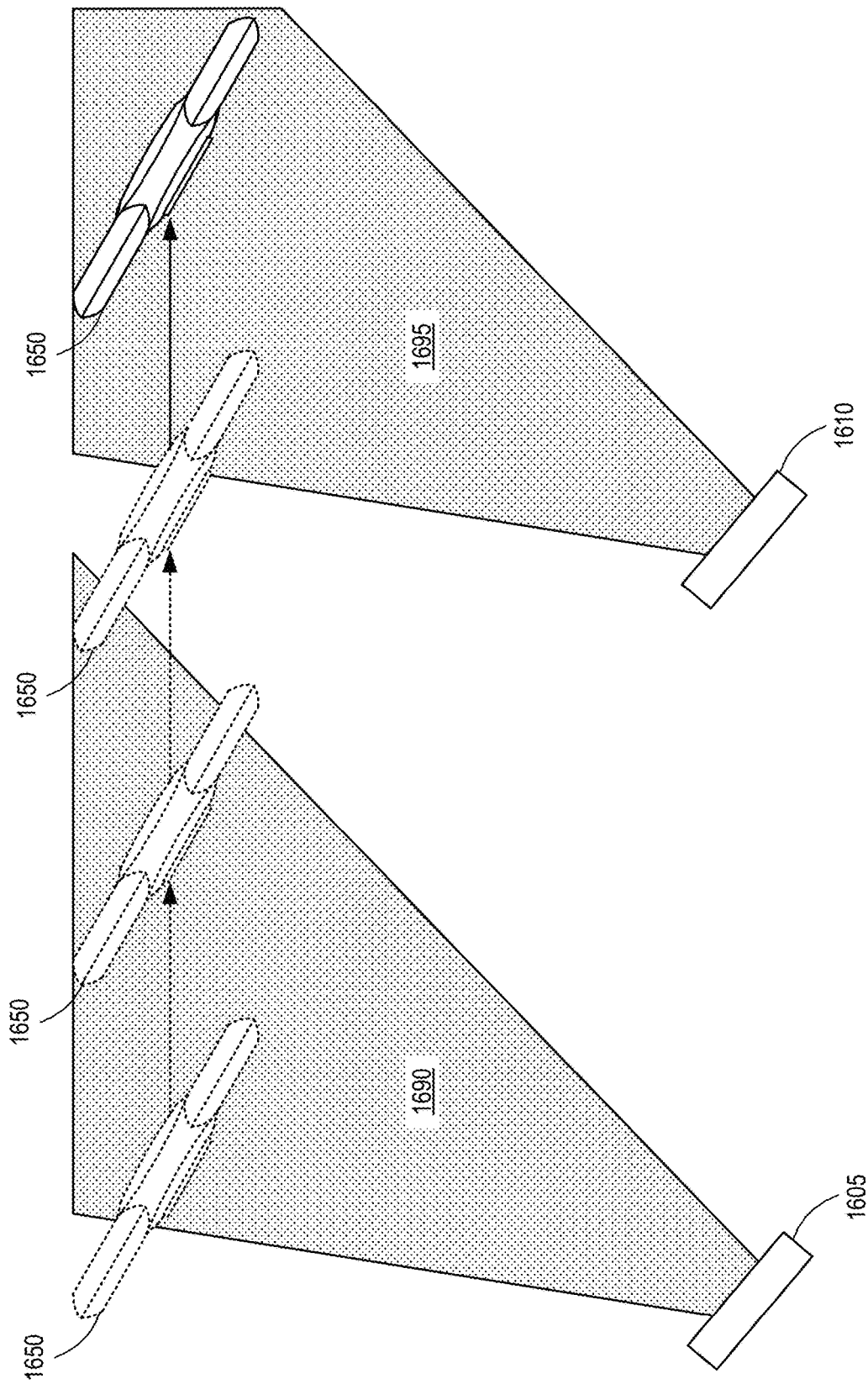
FIG. 16 illustrates a network of wireless power transmission systems angled toward the direction of travel as part of an implementation of a navigational constraint model that limits travel along a path in one direction, according to one embodiment.

FIG. 16 illustrates a network of wireless power transmission systems 1605 and 1610 angled toward the direction of travel as part of an implementation of a navigational constraint model that limits travel along a path in one direction. The angle of the wireless power transmission systems 1605 and 1610 allows for a greater alignment between fields incident on the receiver of the mobile device 1650. That is, the fields are perpendicular to the beam's direction. The alignment between the wireless power transmission system 1605 and the receiver of the mobile device 1650 allows for received power to be normally incident on the receiver of the mobile device 1650, such that the fields are parallel thereto. As illustrated, the wireless power transmission systems 1605 and 1610 provide planar alignment with the receive aperture on the bottom of the mobile device 1650 as it flies forward at an attack angle.

Figure 17A:
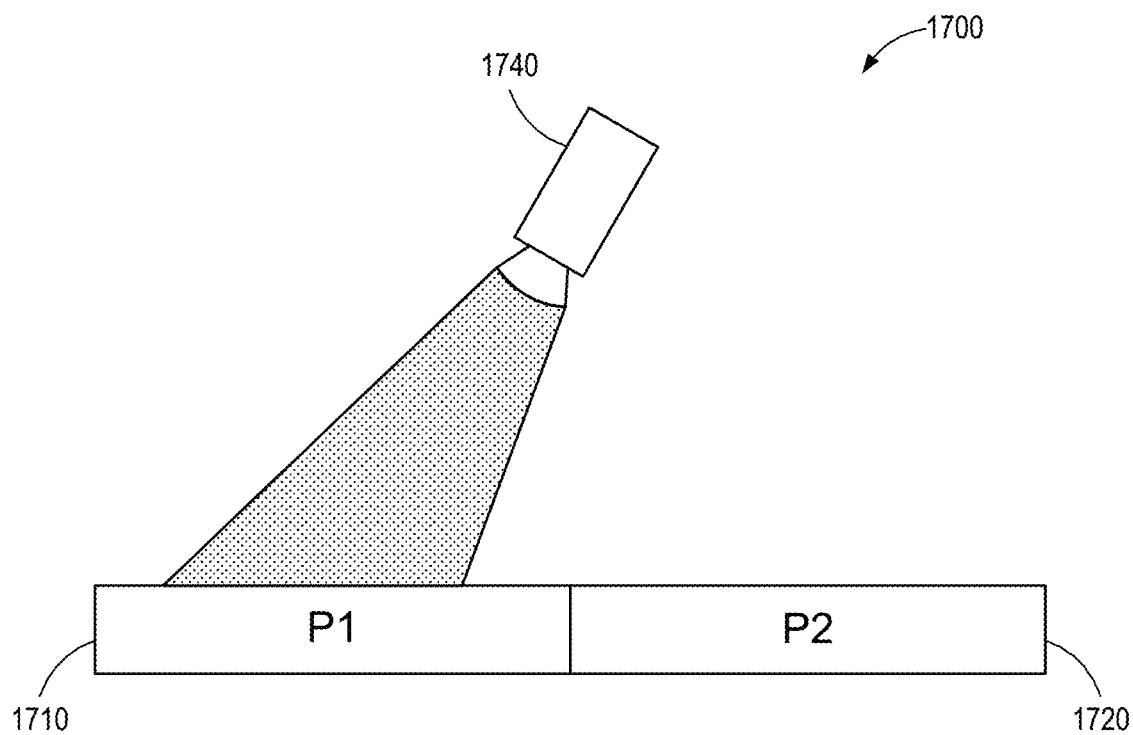
FIG. 17A illustrates a simplified diagram of a portion of a wireless power transmission system with a transmitter element rotated to a first portion of a reflector, according to one embodiment.

FIG. 17A illustrates a simplified diagram of a portion of a wireless power transmission system 1700 with a transmitter element 1740 (e.g., one of an array of transmitter elements) rotated to a first portion of a reflector 1710. The first portion of the reflector 1710 may provide a specific reflection response (e.g., focal range, steering angle in the non-steering direction, beam width, gain, etc.).

Figure 17B:
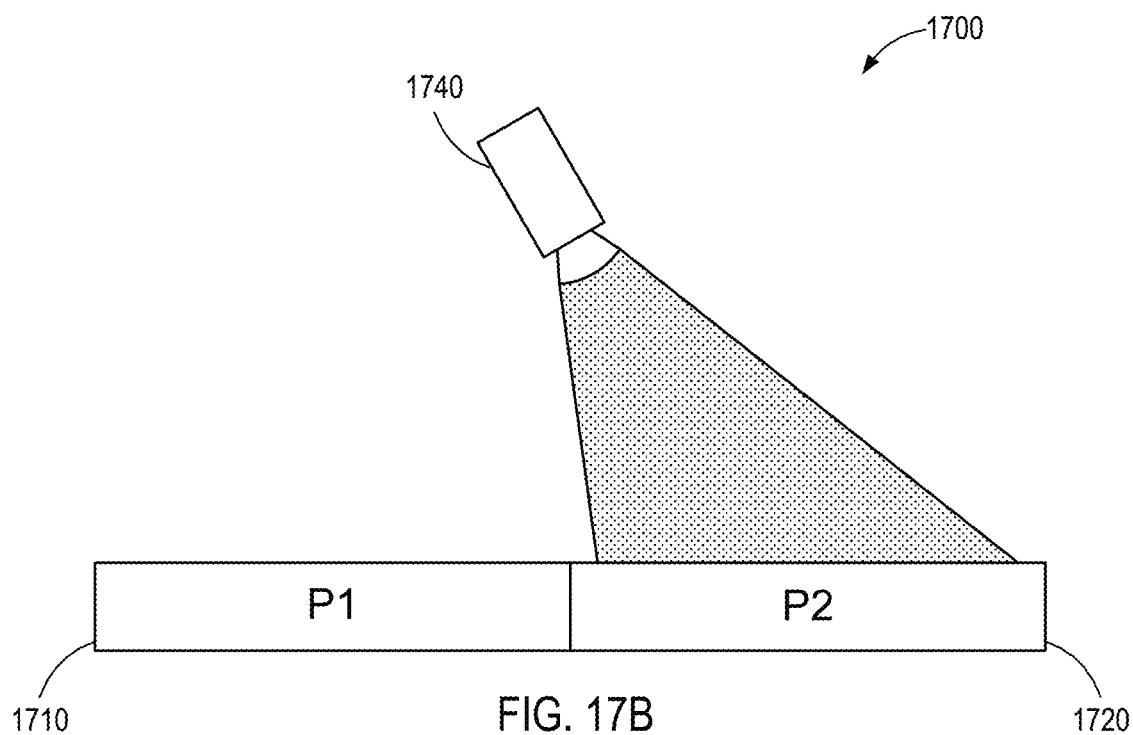
FIG. 17B illustrates a simplified diagram similar to the diagram in FIG. 17A with the transmitter element rotated to a second portion of the reflector, according to one embodiment.

FIG. 17B illustrates a simplified diagram similar to FIG. 17A with the transmitter element 1740 rotated to a second portion 1720 of the reflector that provides a different reflection response (e.g., a different focal range, steering angle in the non-steering direction, beam width, gain, etc.).

Figure 18A:
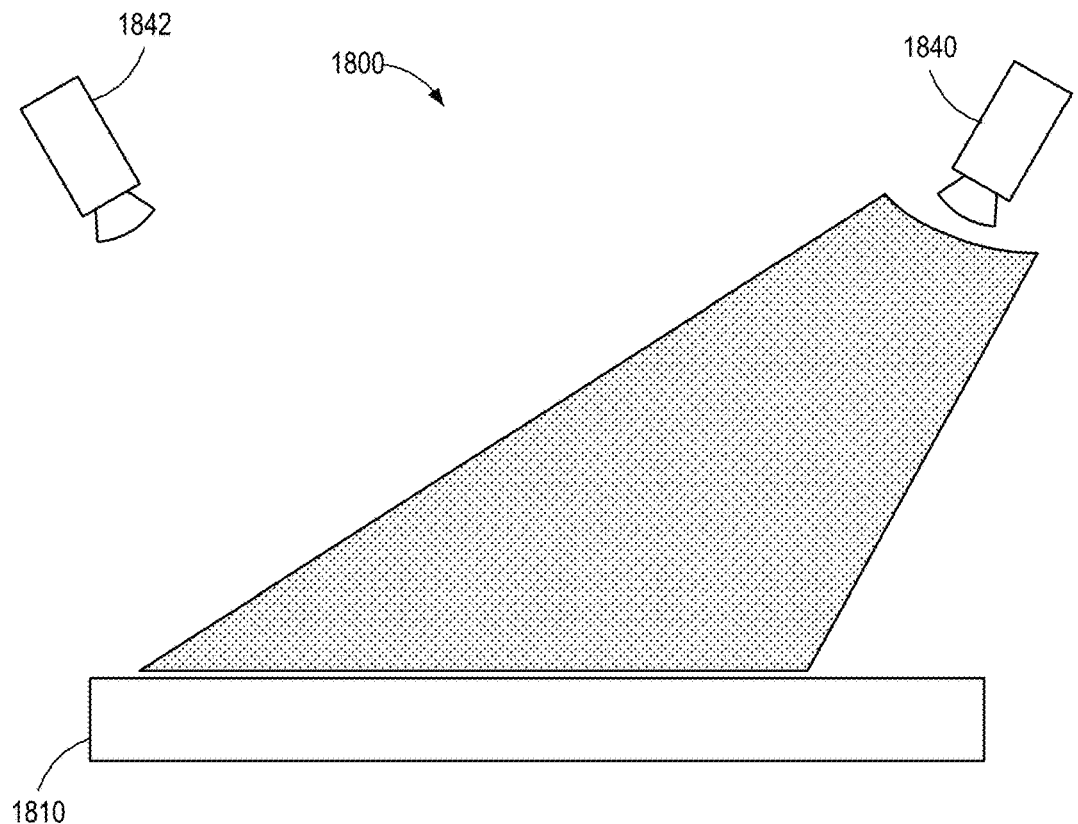
FIG. 18A illustrates a simplified diagram of a portion of a reflector of a wireless power transmission system, according to one embodiment.

FIG. 18A illustrates a simplified diagram of a portion of planar reflector 1810 of a wireless power transmission system 1800 with a dual response based on which of the two arrays (1840 and 1842) of transmitter elements is utilized. Specifically, FIG. 18A illustrates the first array 1840 illuminating the reflector 1810 for a first reflection response with first reflection characteristics.

Figure 18B:
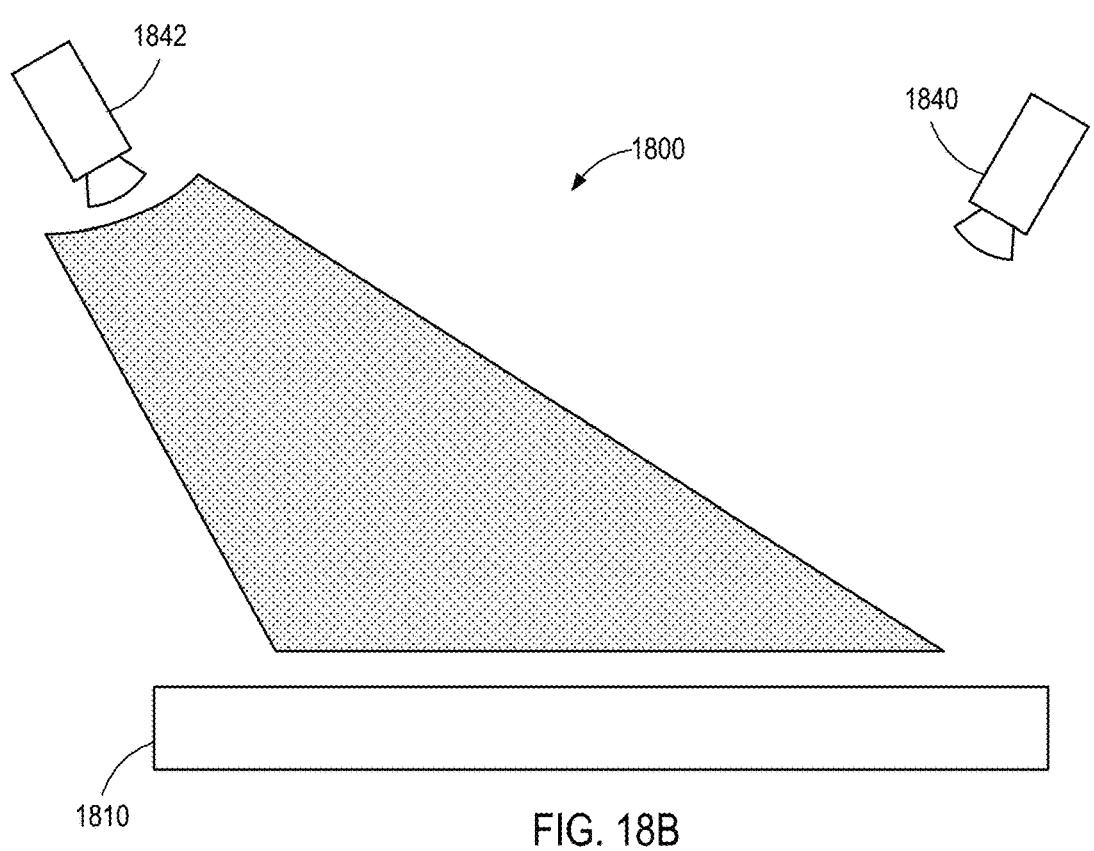
FIG. 18B illustrates another simplified diagram similar to the diagram in FIG. 18A with the second transmitter element activated, according to one embodiment.

FIG. 18B illustrates another simplified diagram similar to FIG. 18A with the second array 1842 of transmitters illuminating the reflector 1810 for a second reflection response with second reflection characteristics.

Figure 19:
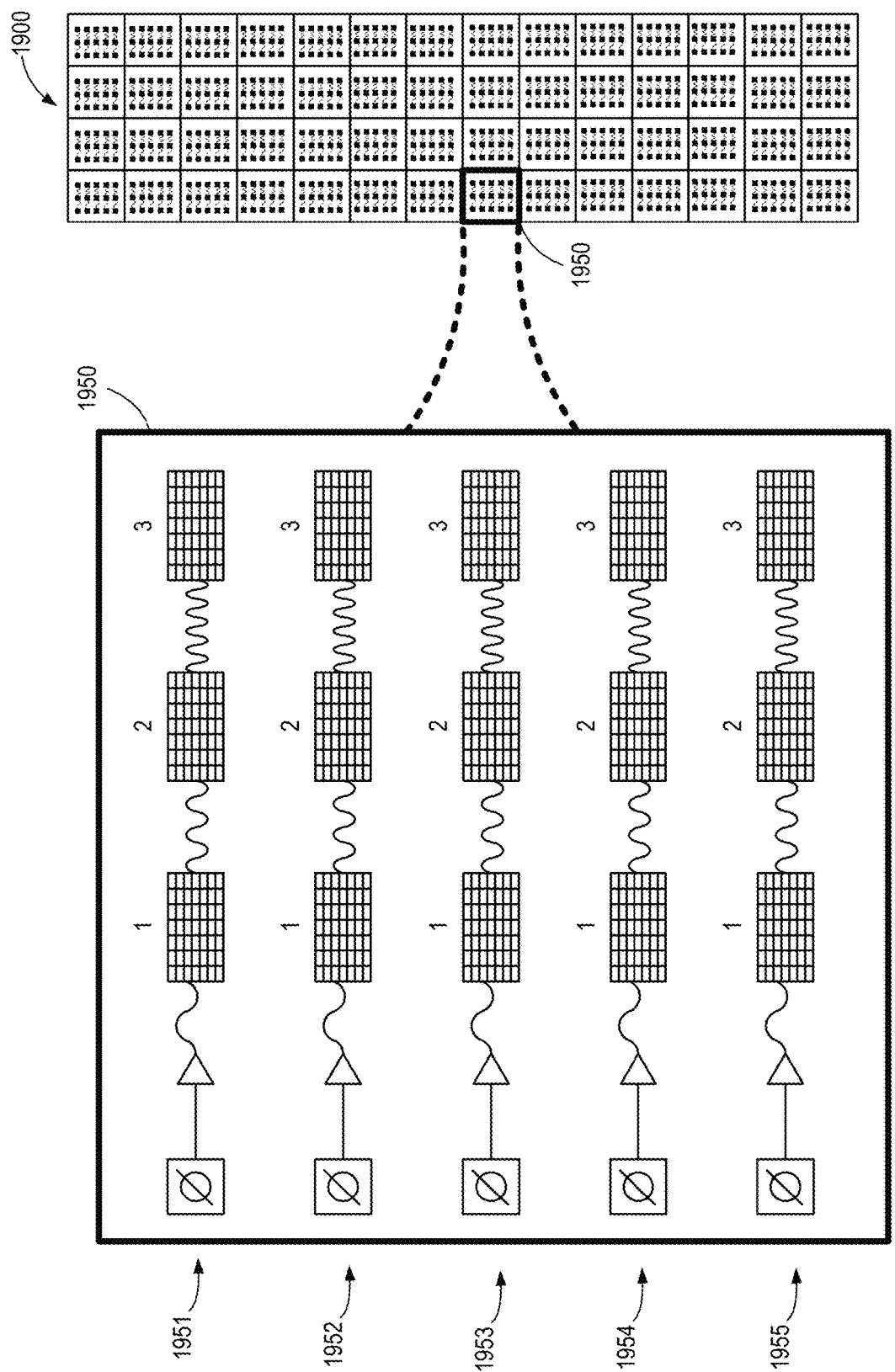
FIG. 19 illustrates an elongated array of tunable antenna elements, each of which includes phase-adjustable sub-elements, according to one embodiment.

FIG. 19 illustrates an elongated array of tunable antenna elements 1900, each of which includes phase-adjustable sub-elements. An enlarged view of a tile 1950 of antenna elements shows five rows 1951-1955 and three columns of antenna elements. The antenna elements in each row are connected with phase-delay components such that the phase of the first, second, and third antenna elements are different from one another. Each row of antenna elements is also phase-adjustable via a single phase controller. Each row might also be equipped with an amplifier, a variable gain amplifier and/or a variable attenuation element.

Figure 20A:
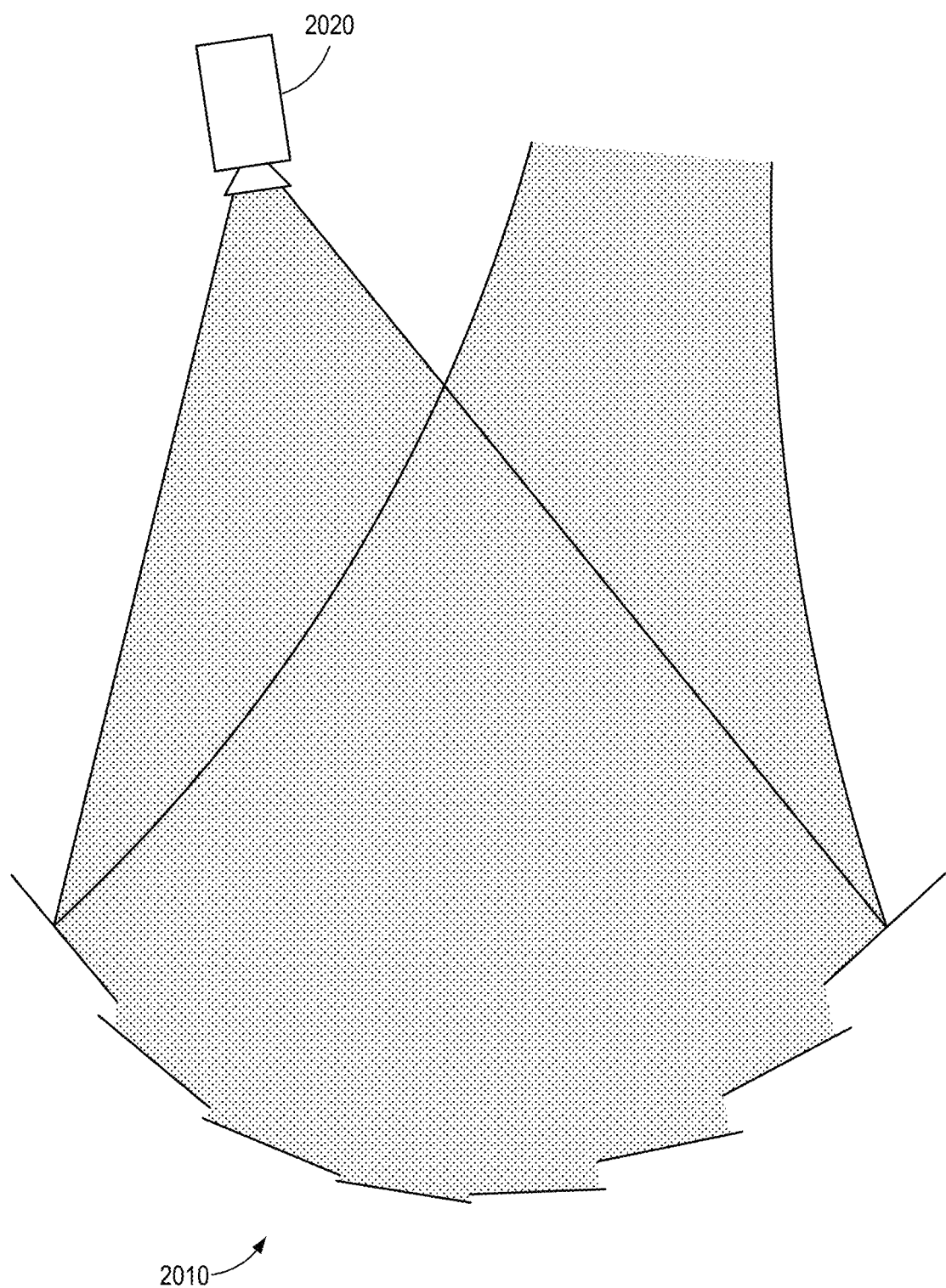
FIG. 20A illustrates a cross-sectional view of a discretized section of an ellipsoidal power transmission system, according to one embodiment.

FIG. 20A illustrates a cross-sectional view of a discretized section of an ellipsoidal power transmission system 2010. As illustrated, a transmitter element 2020 an ellipsoidal reflector may be discretized into a plurality of planar surfaces approximating the angle of reflection of a continuous ellipsoidal reflector. More generally, a reflective surface of any shape can be discretized into a plurality of linear phase slopes and/or nonlinear phase sections.

In many embodiments, to reduce cost and/or complexity, a minimum number of planar surfaces may be utilized that produces a sufficiently accurate reflection for a particular navigational constraint model. In the illustrated embodiment, each approximated planar surface is at an angle that most closely approximates the corresponding portion of the ellipsoidal reflector. In some embodiments, multiple sections of the ellipsoidal reflector may be approximated by discretized planar sections that have the same slope. Utilizing multiple planar sections that have the same slope may result in greater deviation from the ideal ellipsoidal reflector, but reduce the overall complexity and/or cost.

Figure 20B:
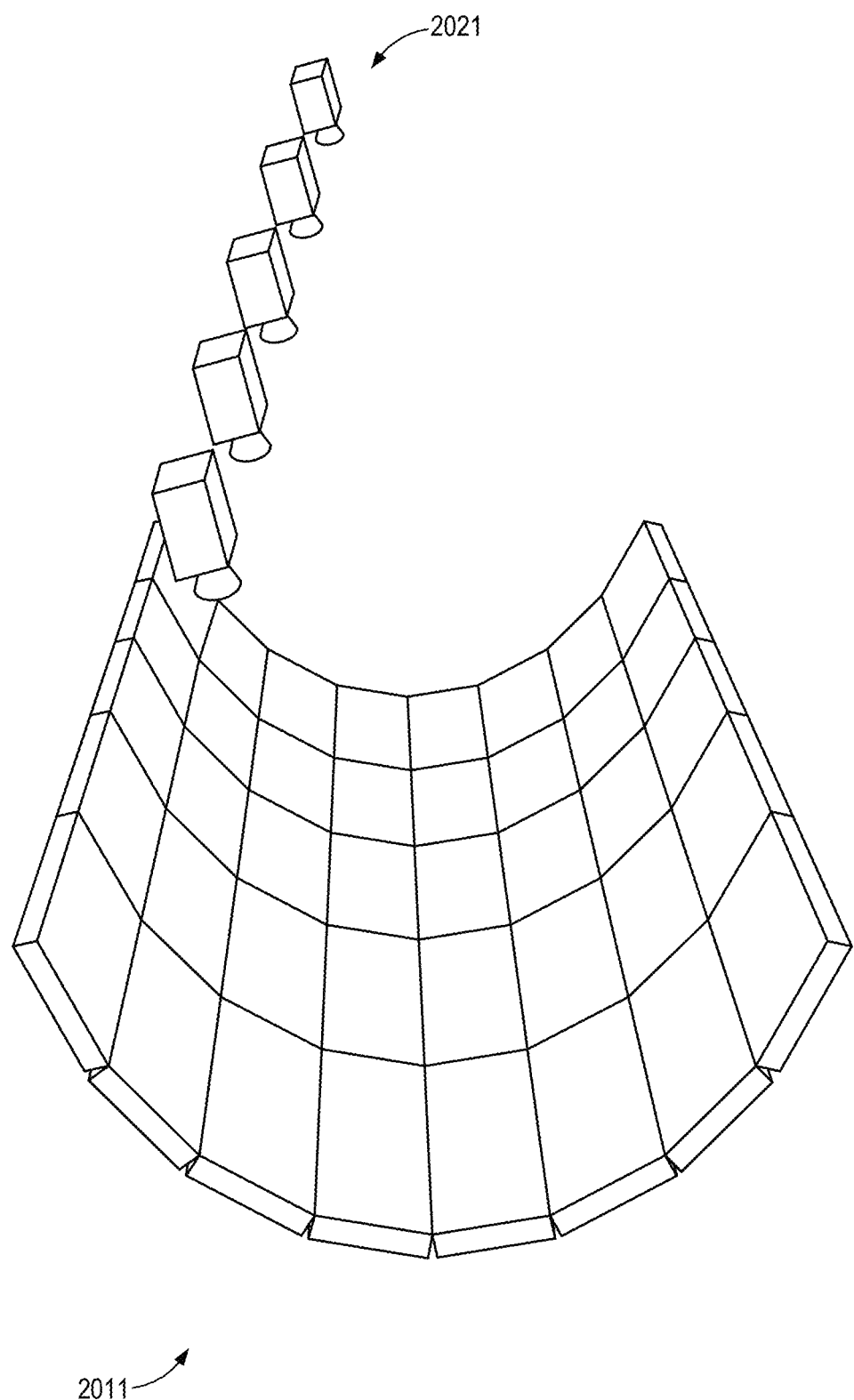
FIG. 20B illustrates a discretized reflector of an ellipsoidal wireless power system, according to one embodiment.

FIG. 20B illustrates an elongated discretized ellipsoidal reflector 2011 with an array of partially offset transmitter elements 2021.

Figure 20C:
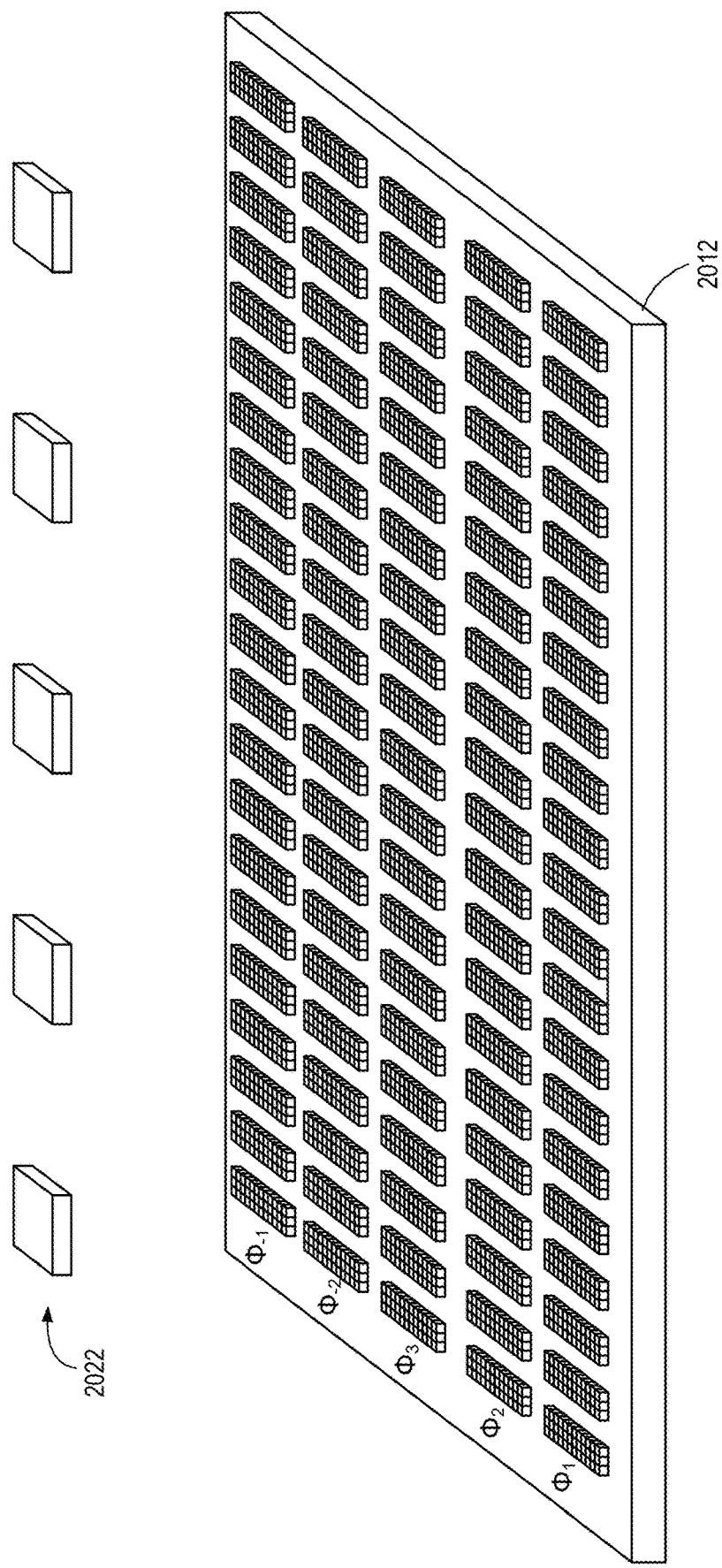
FIG. 20C illustrates an example of a planar wireless power transmission system with discretized reflectors to approximate an ellipsoidal power transmission system with at least two different slopes.

FIG. 20C illustrates a planar wireless power transmission system with discretized reflectors 2012 arranged in columns and rows to approximate an ellipsoidal power transmission system. As illustrated, each row of reflectors 2012 may have a phase response that approximates the reflection portion of a corresponding portion of an elongated ellipsoidal reflector, as can be visualized by rolling the planar wireless power transmission system 2012 up into an elongated ellipsoid with the middle row at the bottom of the trough.

As illustrated, an array of transmitter elements 2022 transmits a wireless power signal to the reflectors 2012. The array of transmitter elements 2022 allows for beam steering in one direction (e.g., in the θ-direction), but not the other direction (e.g., the φ-direction). In some embodiments, the phase response of each row of the reflectors 2012 is static and no beam steering is provided in the φ-direction. In some embodiments, the phase response of each row of the reflectors is at least partially adjustable to allow for limited steering in the φ-direction.

Figure 20D:
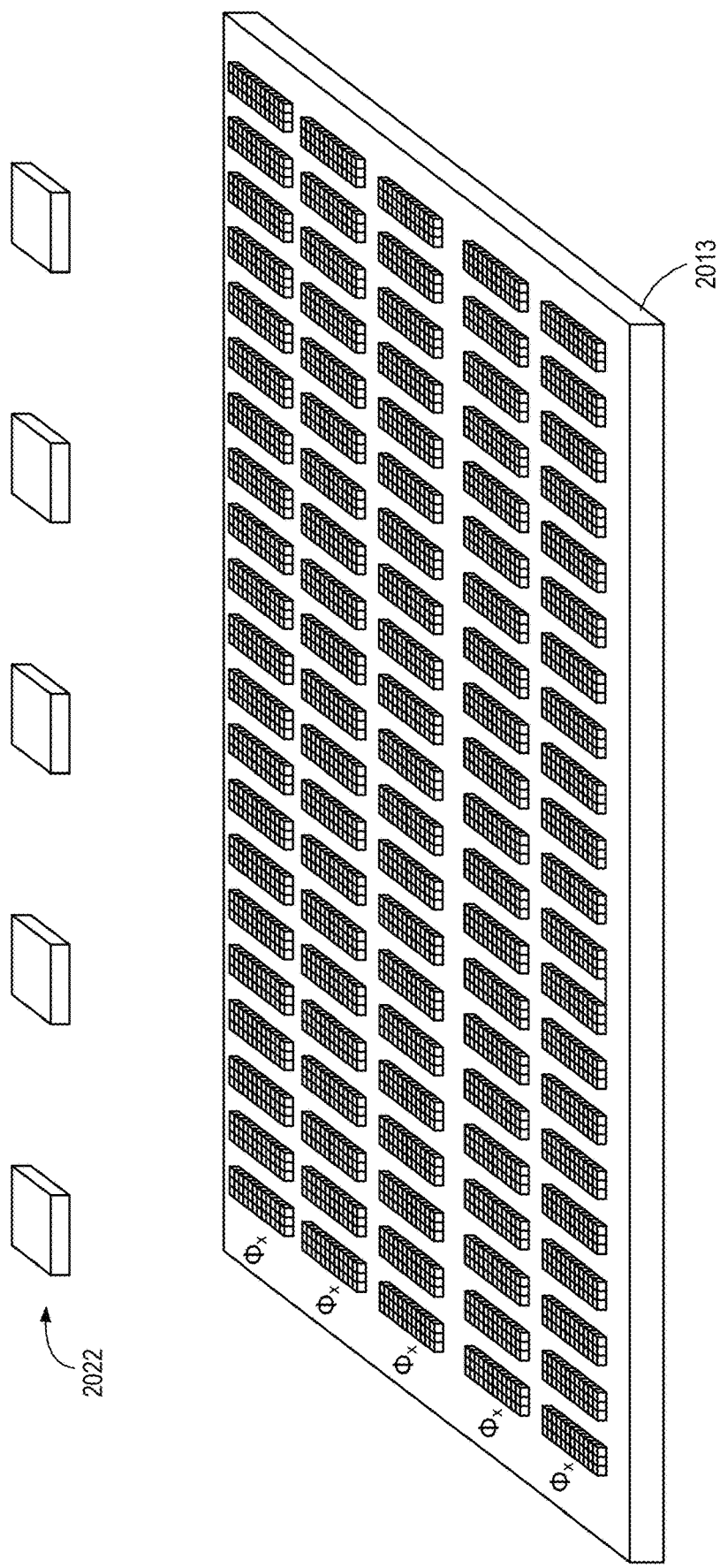
FIG. 20D illustrates another example of a planar wireless power transmission system with discretized reflectors, at least some of which have the same slope.

FIG. 20D illustrates a planar wireless power transmission system with discretized reflectors 2013 similar to those of FIG. 20C, but wherein multiple or all of the discretized reflectors have the same slope.

Figure 21:
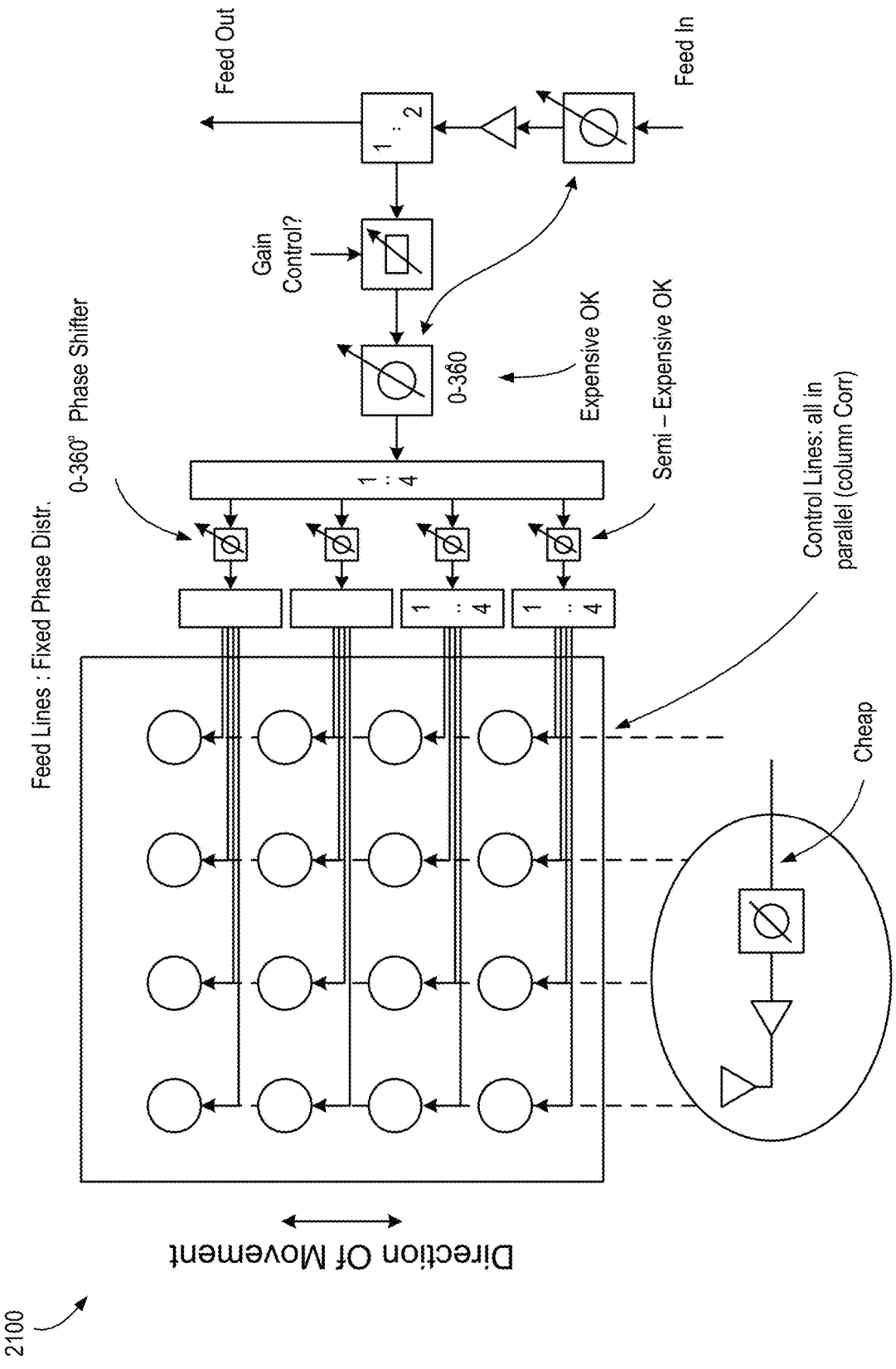
FIG. 21 illustrates a simplified diagram of a phase-tunable wireless power transmission system, according to one embodiment.

FIG. 21 illustrates a simplified diagram 2100 of one possible embodiment of a phase-tunable wireless power transmission system. As illustrated, the wireless power transmission system may include an array of antenna elements. Multiple levels of phase control elements allow for limited phase control of the rows and/or columns of the array of antenna elements. The levels of phase control, as illustrated, may include various feeds, gain controls, and phase shifters. Higher levels of phase control may include relatively expensive phase shifters that allow for relatively flat phase adjustment over a large range of phases. Lower levels of phase control, which include more than one phase shifter, may utilize less expensive phase shifters that provide a flat response over a shorter range of phase adjustment.

The phase shifters in one or more levels of the phase control may facilitate limited gain/attenuation control of a beam form. In other embodiments, one or more independent gain controls and/or variable attenuation elements may be used to provide limited gain control. In still other embodiments, limited gain control may be provided by a combination of phase shifters at one or more levels of the phase control in conjunction with variable gain and/or attenuation elements.

In many of the illustrations, the numbers of antenna elements, reflective elements, and/or transmit elements are shown in the drawings as being one- or two-dimensional arrays with less than ten elements in each direction. In practice, antenna elements may, in a given dimension of an array, number in the tens, hundreds, or even thousands. For example, wherein seven transmit elements are shown in a one-dimensional array in FIG. 4A, the actual number of transmitter elements may be in the tens, hundreds, or even thousands.

Similarly, FIG. 20C shows a planar array of tiles of reflectors 2012 arranged in five rows that each has a unique phase response (tunable or static). In practical applications, the number of rows may number in the tens or even hundreds, while the number of columns may number in the hundreds or even thousands. Thus, it should be appreciated that the drawings are merely illustrative and are not shown to scale. A traditional phased array for that number of antenna elements would require tens of thousands of phase adjusters, while the limited-functionality approaches described herein reduce the number of phase adjusters by one or more orders of magnitude in many instances.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A wireless power transmission system comprising:
 a phased-array of transmitter elements to transmit a wireless power beam as a beamform that is steerable in a first direction (θ-direction); and
 an elongated ellipsoidal reflector to constrain the beamform in a second direction (φ-direction) substantially perpendicular to the first direction.

2. The system of claim 1, wherein the elongated ellipsoidal reflector is configured to constrain the wireless power beam to provide wireless power to a mobile device traveling along a prescribed path in the first direction.

3. The system of claim 2, wherein the mobile device comprises an aerial mobile device.

4. The system of claim 2, wherein the mobile device comprises an unmanned aerial vehicle (UAV).

5. The system of claim 1, wherein the elongated ellipsoidal reflector has a constant radius of curvature along its length.

6. The system of claim 5, wherein the wireless power beam is configured to provide continuous power to an aerial mobile device traveling from a first location to a second location at varying elevations corresponding to varying focal lengths of the wireless power beam at each steering angle in the first direction.

7. The system of claim 1, wherein the elongated ellipsoidal reflector has a radius of curvature that varies along its length.

8. The system of claim 7, wherein the elongated ellipsoidal reflector is flared on one end to provide a longer focal length in a steering angle corresponding to reflections from the one end of the ellipsoidal reflector.

9. The system of claim 7, wherein the elongated ellipsoidal reflector is flared on both ends to provide longer focal lengths in steering angles corresponding to reflections from the ends of the ellipsoidal reflector.

10. The system of claim 9, wherein the wireless power beam is configured to provide continuous power to an aerial mobile device traveling from a first location to a second location at a constant elevation.

11. The system of claim 1, wherein the phased-array of transmitter elements comprises an elongated two-dimensional array of transmitter elements spaced along a length of the reflector in the first direction.

12. A wireless power transmission system comprising:
a phased-array of transmitter elements to transmit a wireless power beam as a beamform that is steerable in a first direction ($\theta$-direction); and
a reflector to constrain the beamform in a second direction ($\phi$-direction) substantially perpendicular to the first direction,
wherein the reflector comprises a partially-tunable planar array steerable as an ellipsoidal reflector with a radius of curvature that varies along its length.

13. The system of claim 12, wherein the partially-tunable planar array provides a first focal length at a steering angle perpendicular to the planar array and increasingly longer focal lengths at increasing angles relative to the perpendicular steering angle.

14. A wireless power transmission system comprising:
a phased-array of transmitter elements to transmit a wireless power beam as a beamform that is steerable in a first direction ($\theta$-direction); and
a reflector to constrain the beamform in a second direction ($\phi$-direction) substantially perpendicular to the first direction,
wherein the phased-array of transmitter elements comprises an elongated two-dimensional array of transmitter elements spaced along a length of the reflector in the first direction, and
wherein a spacing distance between transmitter elements along the length of the reflector is greater than an operational wavelength, and wherein a spacing distance between transmitter elements along a width of the reflector is less than an operational wavelength.

15. The system of claim 14, wherein the spacing distance between transmitter elements along the width of the reflector is less than one-half of an operational wavelength.

16. A method for providing wireless power to a mobile device traveling along a prescribed path, comprising:
powering the mobile device via a first one-directionally steerable wireless power transmitter as the mobile device travels from a first location to a second location; and
powering the mobile device via a second one-directionally steerable wireless power transmitter as the mobile device travels from the second location to a third location,
wherein each of the first and second one-directionally steerable wireless power transmitters comprises:
a phased-array of transmitter elements to transmit a wireless power beam as a beamform that is steerable along a path defined by the first, second, and third locations ($\theta$-direction), and
an elongated ellipsoidal reflector to constrain the beamform in a second direction ($\phi$-direction) substantially perpendicular to the path.

17. The method of claim 16, wherein the first location, the second location, and the third location are in a straight line.

18. The method of claim 16, wherein the first location and the second location are in a first straight line, the second location and the third location are in a second straight line, and the first straight line and the second straight line are at an angle with respect to one another.

19. The method of claim 16, wherein the elongated ellipsoidal reflector of each wireless power transmitter extends along the first direction ($\theta$-direction).

20. The method of claim 16, wherein the elongated ellipsoidal reflector of each wireless power transmitter is configured to create a substantially circular beamform focus.

21. The method of claim 16, wherein the elongated ellipsoidal reflector of each wireless power transmitter is configured to create a substantially rectangular beamform focus.

22. The method of claim 16, wherein the elongated ellipsoidal reflector of each wireless power transmitter is configured to create a substantially ring-shaped beamform focus.

23. The method of claim 16, wherein the elongated ellipsoidal reflector of each wireless power transmitter has a constant radius of curvature along its length.

24. The method of claim 16, wherein the elongated ellipsoidal reflector of each wireless power transmitter has a radius of curvature that varies along its length.

25. A method for providing wireless power to a mobile device traveling along a prescribed path, comprising:
powering the mobile device via a first one-directionally steerable wireless power transmitter as the mobile device travels from a first location to a second location; and
powering the mobile device via a second one-directionally steerable wireless power transmitter as the mobile device travels from the second location to a third location,
wherein each of the first and second one-directionally steerable wireless power transmitters comprises:
a phased-array of transmitter elements to transmit a wireless power beam as a beamform that is steerable along a path defined by the first, second, and third locations ($\theta$-direction), and
a reflector to constrain the beamform in a second direction ($\phi$-direction) substantially perpendicular to the path,
wherein the reflector of each wireless power transmitter comprises a partially-tunable planar array steerable as an elongated ellipsoidal reflector.

26. The method of claim 25, wherein the partially-tunable planar array is steerable as an elongated ellipsoidal reflector that has a constant radius of curvature along its length, and
wherein the wireless power beam is configured to provide continuous power to the mobile device traveling from a first location to a second location at varying elevations corresponding to varying focal lengths of the wireless power beam at each steering angle in the first direction.

27. The method of claim 25, wherein the partially-tunable planar array is steerable as an elongated ellipsoidal reflector with a radius of curvature that varies along its length.

\* \* \* \* \*